United States Patent
Shinde et al.

(10) Patent No.: US 12,104,531 B2
(45) Date of Patent: Oct. 1, 2024

(54) COOLING SYSTEM FOR A TURBINE ENGINE

(71) Applicant: General Electric Company, Schenectady, NY (US)

(72) Inventors: Kudum Shinde, Bengaluru (IN); Sesha Subramanian, Bengaluru (IN); Rachamadugu Sivaprasad, Bengaluru (IN); Ravindra Shankar Ganiger, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/059,519

(22) Filed: Nov. 29, 2022

(65) Prior Publication Data

US 2024/0026821 A1    Jan. 25, 2024

(30) Foreign Application Priority Data

Jul. 22, 2022  (IN) .............................. 202211042023

(51) Int. Cl.
*F02C 7/12*  (2006.01)
*F02C 3/04*  (2006.01)

(52) U.S. Cl.
CPC .................. *F02C 7/12* (2013.01); *F02C 3/04* (2013.01); *F05D 2260/20* (2013.01)

(58) Field of Classification Search
CPC ........... F02C 7/12; F02C 3/04; F05D 2260/20
See application file for complete search history.

(56) References Cited

U.S. PATENT DOCUMENTS

| | | | |
|---|---|---|---|
| 4,082,967 A | 4/1978 | Laskaris | |
| 9,331,552 B2 | 5/2016 | Fedoseyev et al. | |
| 10,337,405 B2 | 7/2019 | Steen et al. | |
| 10,427,632 B2 | 10/2019 | Jackowski et al. | |
| 10,443,622 B2 | 10/2019 | Rasmussen | |
| 10,450,957 B2 | 10/2019 | Pearson et al. | |
| 10,781,754 B2 | 9/2020 | Chiasson et al. | |
| 10,947,993 B2 | 3/2021 | Shinde et al. | |
| 11,149,642 B2 | 10/2021 | Bayraktar et al. | |
| 2013/0192253 A1* | 8/2013 | Ackermann | F01D 25/183 60/785 |
| 2013/0280028 A1* | 10/2013 | Benjamin | F02C 7/12 415/177 |
| 2017/0335768 A1* | 11/2017 | Steen | F01D 9/065 |
| 2020/0378307 A1* | 12/2020 | Roberge | F02C 7/36 |

FOREIGN PATENT DOCUMENTS

| | | | |
|---|---|---|---|
| FR | 3127024 A1 | 3/2023 | |
| FR | 3127025 A1 | 3/2023 | |

* cited by examiner

*Primary Examiner* — Brandon D Lee
(74) *Attorney, Agent, or Firm* — Venable LLP; Peter T. Hrubiec; Michele V. Frank

(57) ABSTRACT

A cooling system for a turbine engine. The turbine engine includes a compressor, a turbine, and a shaft that drivingly couples the compressor and the turbine. The cooling system includes one or more cavities of the compressor. The cooling system includes a shaft flowpath defined in the shaft. The shaft includes one or more shaft apertures that provide fluid communication between the shaft flowpath and the one or more cavities. Air passes through the one or more shaft apertures and the shaft flowpath during a shutdown of the turbine engine to cool the one or more cavities.

20 Claims, 15 Drawing Sheets

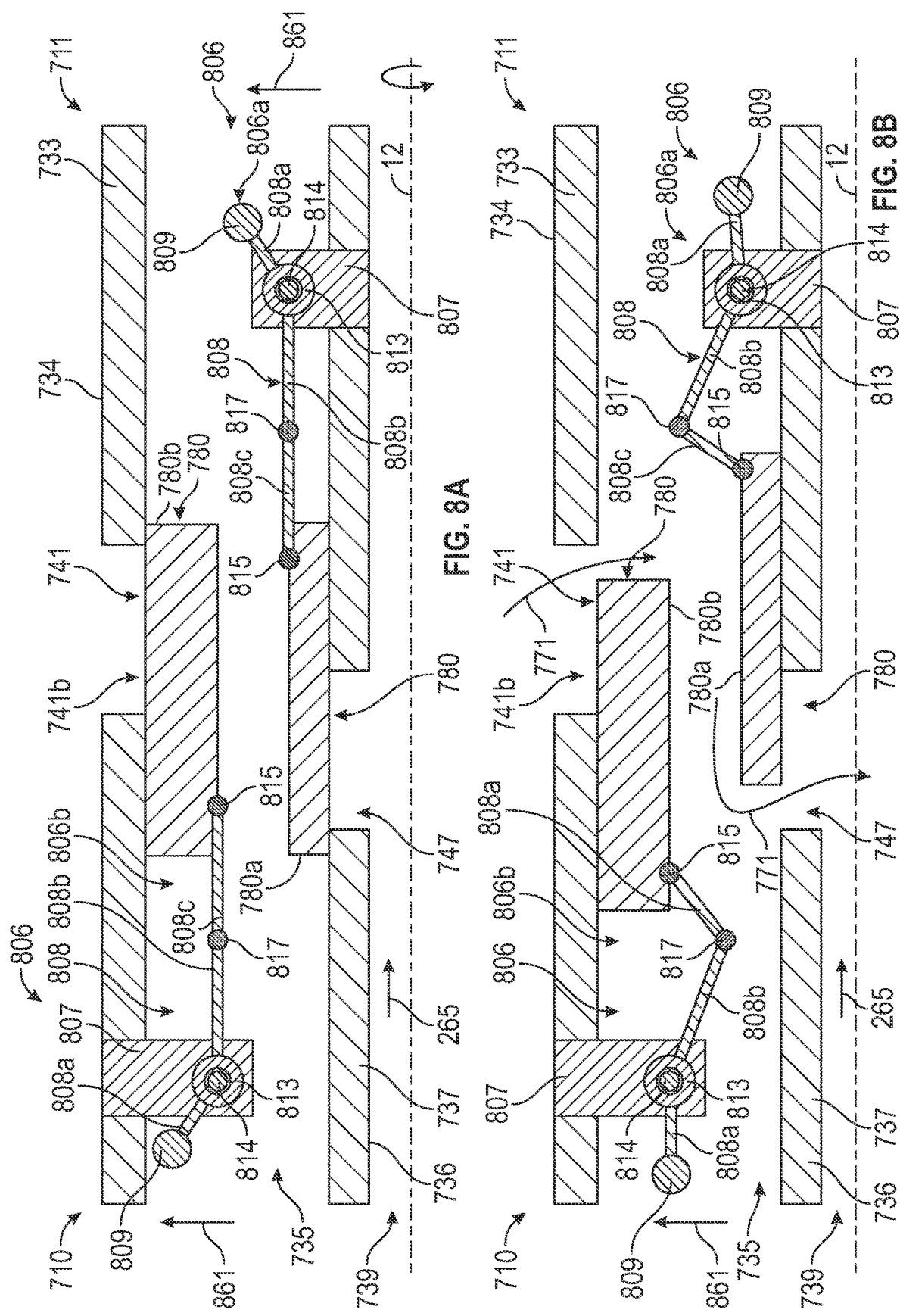

COOLING SYSTEM FOR A TURBINE ENGINE

CROSS REFERENCE TO RELATED APPLICATIONS

The present application claims the benefit of Indian Patent Application No. 202211042023, filed on Jul. 22, 2022, which is hereby incorporated by reference herein in its entirety.

TECHNICAL FIELD

The present disclosure relates generally to cooling systems for turbine engines.

BACKGROUND

A turbine engine generally includes a fan and a core section arranged in flow communication with one another.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

FIG. 8A is a partial schematic cross-sectional diagram of a portion of another cooling system for a turbine engine, taken along a longitudinal centerline of the turbine engine, according to another embodiment of the present disclosure.

FIG. 8B is a partial schematic cross-sectional diagram of the cooling system of FIG. 8A during a shutdown of the turbine engine, according to another embodiment of the present disclosure.

DETAILED DESCRIPTION

Figure 1:
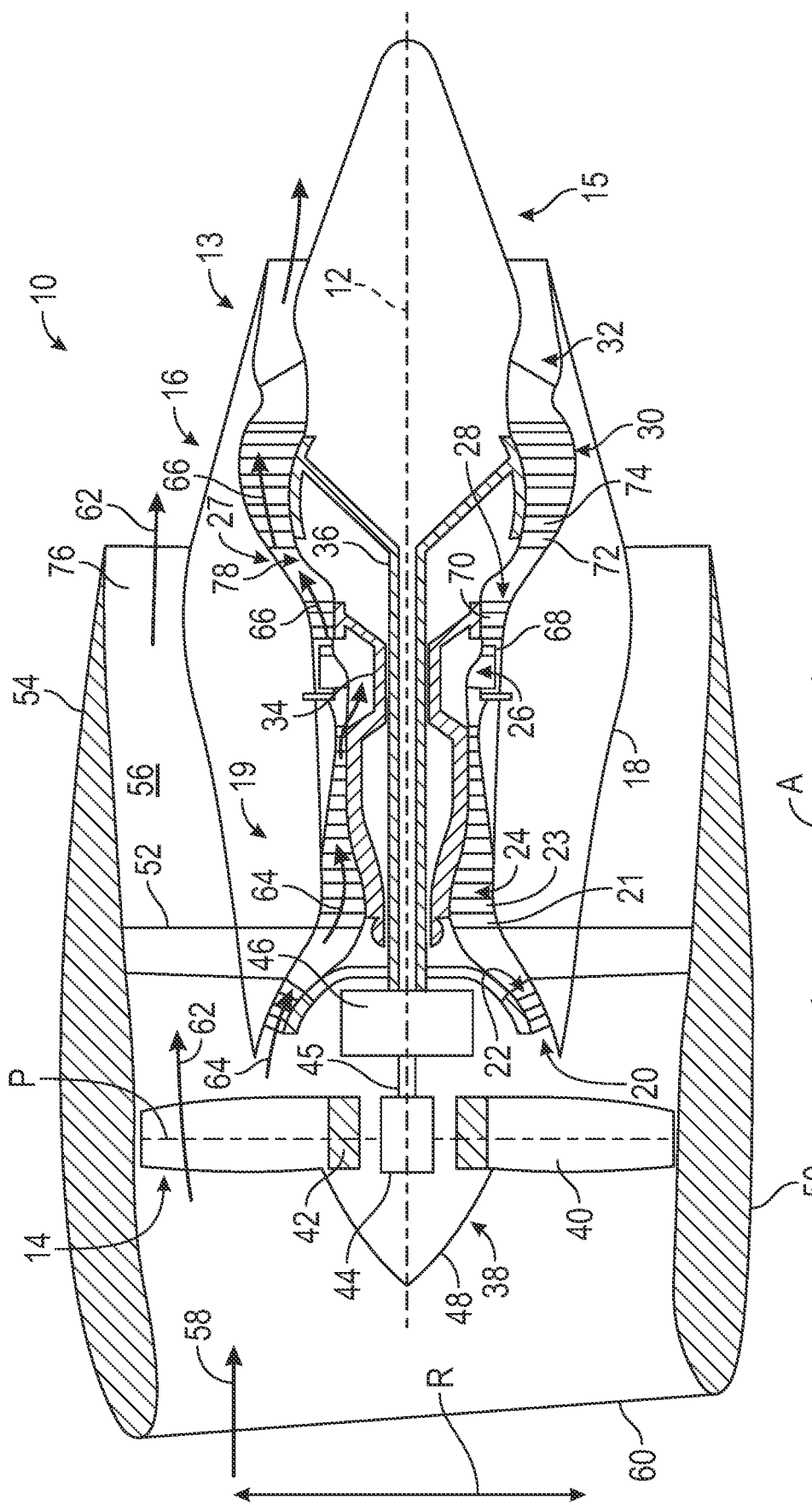
FIG. 1 is a schematic cross-sectional diagram of a turbine engine, taken along a longitudinal centerline of the turbine engine, according to an embodiment of the present disclosure.

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Turbine engines generate heat at the rotor assemblies (e.g., the HP shaft or the LP shaft) during operation. Following a shutdown of the turbine engine, the rotor assemblies are stationary (e.g., not rotating), which generally results in asymmetric heat distribution or thermal gradients circumferentially or axially along the rotor assemblies. Such thermal gradients may generally result in thermal bowing or rotor bow, such as along the radial, the axial, or the circumferential directions. Rotor bow results in relatively large eccentricity relative to one or more casings surrounding the rotor assemblies. As such, when the turbine engine resumes operation, such eccentricity may generally cause the rotor assemblies to operate with undesirable magnitudes of vibrations that may damage surrounding casings, bearing assemblies, load structures, etc. Further, such operation of the turbine engine may result in airfoil blade tips rubbing into the surrounding casing, resulting in damage to the blades, to the casings, or to both the blades and the casings. Therefore, embodiments of the present disclosure provide for a cooling system to cool the core turbine engine during shutdown of the turbine engine to reduce, to prevent, or to limit rotor bow.

Embodiments of the present disclosure provide for a cooling system to cool cavities of the HP compressor uniformly after shutdown of the turbine engine to reduce the rotor bow. The cooling system includes circumferential openings in the LP shaft and the HP shaft. The LP shaft includes a central duct or a flowpath. The flowpath of the LP shaft is connected to a pump (e.g., a suction pump or a blower pump) that is activated to ventilate forward cavities and aft cavities of the HP compressor. The cooling system also includes a valve arrangement that includes valves associated with the circumferential openings. The valves open during the shutdown of the turbine engine to allow for the ventilation of the forward cavities and the aft cavities. In some embodiments, the valves include sleeves that move radially to seal the circumferential openings. During operation of the turbine engine, the sleeves move radially outward due to centrifugal force caused by the rotating LP shaft. During the shutdown of the turbine engine, the sleeves move radially inward due to gravity and open the circumferential openings. The sleeves can be spring loaded or pressure loaded. In some embodiments, the sleeves include cylindrical sleeves disposed in the flowpath of the LP shaft. The cylindrical sleeves move axially forward and axially aft to open and to close the circumferential openings.

Embodiments of the present disclosure also provide for a method of cooling the turbine engine during the shutdown of the turbine engine. The method includes determining the thermal conditions of the HP compressor based on measured engine parameters. The method also includes checking the HP compressor susceptibility to rotor bow based on the thermal conditions. If the HP compressor is not susceptible to rotor bow during the shutdown, the method terminates. If the HP compressor is susceptible to rotor bow during the shutdown, the method actuates a pressurized air valve of the pump or blower to ventilate the cavities. The method operates the pressurized air valve until the thermal conditions for rotor bow are reduced or diminished. When the thermal conditions for rotor bow have reduced or diminished, the method terminates, and the pressurized air valve is closed.

In some embodiments, the pump is a blower pump that circulates cold air into the flowpath of the LP shaft, through the circumferential openings, and into the cavities. In some embodiments, the pump is a suction pump that extracts the hot air from the cavities. Thus, the cooling system of the present disclosure reduces or prevents rotor bow.

Referring now to the drawings, FIG. 1 is a schematic cross-sectional diagram of a turbine engine 10, according to an embodiment of the present disclosure. As shown in FIG. 1, the turbine engine 10 defines an axial direction A (extending parallel to a longitudinal centerline 12 provided for reference) and a radial direction R that is normal to the axial direction A. The turbine engine 10 includes a vertically upper portion 13 that is vertically above the longitudinal centerline 12 in an orientation of the turbine engine 10 illustrated in FIG. 1. The turbine engine 10 includes a vertically lower portion 15 that is vertically below the longitudinal centerline 12 in the orientation of the turbine engine 10 illustrated in FIG. 1. In general, the turbine engine 10 includes a fan section 14 and a core turbine engine 16 disposed downstream from the fan section 14.

The core turbine engine 16 generally includes an outer casing 18 that is substantially tubular and defines an annular inlet 20. As schematically shown in FIG. 1, the outer casing 18 encases, in serial flow relationship, a compressor section 19 including a booster or a low pressure (LP) compressor 22 followed downstream by a high pressure (HP) compressor 24, a combustion section 26, a turbine section 27 including a high pressure (HP) turbine 28 followed downstream by a low pressure (LP) turbine 30, and a jet exhaust nozzle section 32. A high pressure (HP) shaft 34 or spool drivingly connects the HP turbine 28 to the HP compressor 24 to rotate the HP turbine 28 and the HP compressor 24 in unison. A low pressure (LP) shaft 36 drivingly connects the LP turbine 30 to the LP compressor 22 to rotate the LP turbine 30 and the LP compressor 22 in unison. The compressor section 19, the combustion section 26, the turbine section 27, and the jet exhaust nozzle section 32 together define a core air flowpath.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the longitudinal centerline 12 via a fan shaft 45 that is powered by the LP shaft 36 across a power gearbox 46. The power gearbox 46 includes a plurality of gears for adjusting the rotational speed of the fan shaft 45 and, thus, the fan 38 relative to the LP shaft 36 to a more efficient rotational fan speed.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38, at least a portion of the core turbine engine 16, or both the fan 38 and at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an inlet 60 of the nacelle 50. As the volume of air 58 passes across the fan blades 40, a first portion of air 62 is directed or routed into the bypass airflow passage 56, and a second portion of air 64 is directed or is routed into the upstream section of the core air flowpath, or, more specifically, into the annular inlet 20 of the LP compressor 22. The ratio between the first portion of air 62 and the second portion of air 64 is commonly known as a bypass ratio. The pressure of the second portion of air 64 is then increased as it is routed through the HP compressor 24 and compressed via sequential stages of HP compressor stator vanes 21 coupled to the outer casing 18 and HP compressor rotor blades 23 coupled to the HP shaft. The second portion of air 64 is then routed into the combustion section 26, where the highly pressurized air is mixed with fuel and burned to provide combustion gases 66.

The combustion gases 66 are routed into the HP turbine 28 and expanded through the HP turbine 28 where a portion of thermal energy or kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate. This thereby supports operation of the LP compressor 22 and rotation of the fan 38 via the power gearbox 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable gas turbine engine, such as, for example, turbofan engines, propfan engines, turbojet engines, or turboshaft engines.

Figure 2A:
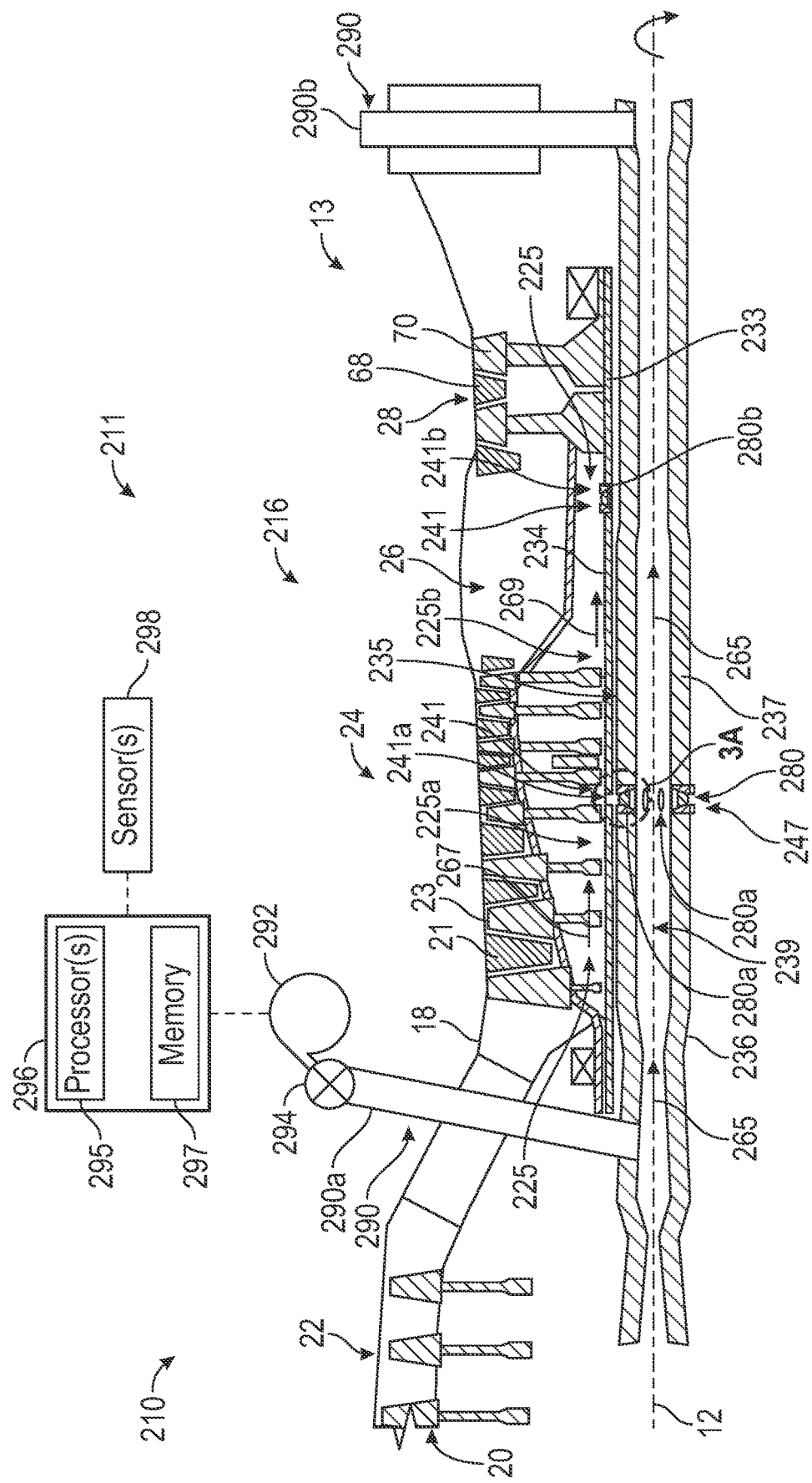
FIG. 2A is a partial schematic cross-sectional diagram of a core turbine engine, taken along a longitudinal centerline of the turbine engine having a cooling system and during operation of the turbine engine, according to an embodiment of the present disclosure.

FIG. 2A is a schematic cross-sectional diagram of a core turbine engine 216 for a turbine engine 210 having a cooling system 211, according to an embodiment of the present disclosure. FIG. 2A shows the turbine engine 210 in an operating mode, as detailed further below. The core turbine engine 216 may be used in the turbine engine 10 of FIG. 1 and like numbers in FIG. 2A represent like components of FIG. 1. The operation of the turbine engine 210 may be the same as or similar to the operation of the turbine engine 10. The cooling system 211 includes an HP shaft 234 and an LP shaft 236 of the turbine engine 210. One or more cavities 225 are defined radially between the HP shaft 234 and the HP compressor rotor blades 23. In the embodiment of FIG. 2A, the one or more cavities 225 include a first cavity 225a, also referred to as a forward cavity, and a second cavity 225b, also referred to as an aft cavity. For example, the second cavity 225b is located downstream of the first cavity 225a. The one or more first cavities 225a are in fluid communication with an upstream portion of the HP compressor 24 (e.g., an inlet portion and/or upstream stages of the HP compressor 24) and the one or more second cavities 225b are in fluid communication with a downstream portion of the HP compressor 24 (e.g., downstream stages of the HP compressor 24) and with the HP turbine 28.

Although, with the exception of LP shaft 236, FIG. 2A shows only a vertically upper portion 13 of the turbine engine 210 for clarity, the features in FIG. 2A are present on a vertically lower portion 15 of the turbine engine, for example, as shown in FIG. 1. Thus, the first cavity 225a and the second cavity 225b are annular cavities extending around the longitudinal centerline 12.

The HP shaft 234 is an annular hollow shaft. The HP shaft 234 includes a wall 233 that defines an HP shaft flowpath 235. The LP shaft 236 is disposed within the HP shaft 234 such that the HP shaft flowpath 235 is defined between the wall 233 and the LP shaft 236. The HP shaft 234 includes one or more apertures 241, also referred to as HP shaft apertures 241. The HP shaft apertures 241 provide fluid communication between the HP shaft 234 and the one or more cavities 225. The HP shaft apertures 241 include a plurality of HP shaft apertures 241 positioned circumferentially about the HP shaft 234. Any number of HP shaft apertures 241 are contemplated. In the embodiment of FIG. 2A, the HP shaft apertures 241 include first HP shaft apertures 241a and second HP shaft apertures 241b. The first HP shaft apertures 241a are located on the HP shaft 234 to provide fluid communication between an interior of the HP shaft 234 and the first cavity 225a. The second HP shaft apertures 241b are located on the HP shaft 234 to provide fluid communication between an interior of the HP shaft 234 and the second cavity 225b. In this way, the second HP shaft apertures 241b are located downstream of the first HP shaft apertures 241a. Thus, fluid, such as air, can flow through the HP shaft apertures 241 and into the one or more cavities 225, as detailed further below.

The LP shaft 236 is an annular hollow shaft that includes a wall 237 that defines an LP shaft flowpath 239. The LP shaft 236 includes one or more apertures 247, also referred to as LP shaft apertures 247. The LP shaft apertures 247 provide fluid communication between the LP shaft flowpath 239 and the one or more cavities 225 via the HP shaft apertures 241. The LP shaft apertures 247 include a plurality of LP shaft apertures 247 positioned circumferentially about the LP shaft 236. Any number of LP shaft apertures 247 are contemplated. The number of LP shaft apertures 247 and the number of HP shaft apertures 241 may be the same. The LP shaft apertures 247 extend through the wall 237 of the LP shaft 236. In the embodiment of FIG. 2A, the LP shaft apertures 247 are located on the LP shaft 236 to provide fluid communication between the LP shaft flowpath 239 within the LP shaft 236 and the first cavity 225a. In some embodiments, the LP shaft apertures 247 include LP shaft apertures located on the LP shaft 236 to provide fluid communication between the LP shaft flowpath 239 and the second cavity 225b. The LP shaft apertures 247 are generally axially align with the HP shaft apertures 241. In this manner, fluid flows through the LP shaft flowpath 239 and into the one or more cavities via the aligned LP shaft apertures 247 and HP shaft apertures 241.

The LP shaft 236 and/or the HP shaft 234 also include one or more valves 280. The one or more valves 280 include one or more first valves 280a that are disposed in the wall 237 of the LP shaft 236 at the LP shaft apertures 247. For example, each LP shaft aperture 247 includes a corresponding first valve 280a disposed therein. Similarly, the one or more valves 280 include one or more second valves 280b that are disposed in the wall 233 of the HP shaft 234 at the second HP shaft apertures 241b. For example, each second HP shaft aperture 241b includes a corresponding second valve 280b disposed therein. In this way, the one or more valves 280 include one or more first valves 280a disposed in the LP shaft apertures 247 and one or more second valves 280b disposed in the second HP shaft apertures 241b. In some embodiments, the one or more valves 280 are positioned in the one or more first HP shaft apertures 241a. Accordingly, the one or more valves 280 may be located in any of the upstream and/or downstream apertures in the HP shaft 234 and/or in the LP shaft 236. In the embodiment of FIG. 2A, the one or more valves 280 are passive valves in which an operational state (e.g., opened or closed) of the one or more valves 280 is controlled by gravitational force or fluid force. In some embodiments, the one or more valves 280 are spring-loaded or pressure-loaded, as detailed further below. The one or more valves 280 may, of course, include active valves that include an actuation method (e.g., magnetic, electric, etc.) that are actuated by a controller to control the operational state of the one or more valves 280.

The cooling system 211 includes one or more conduits 290. The one or more conduits 290 include hollow tubes, or the like, that each defines an air flowpath. The one or more conduits 290 are in fluid communication with the LP shaft flowpath 239 of the LP shaft 236. In this way, air can flow through the one or more conduits 290 into the LP shaft flowpath 239, or air can flow from the LP shaft flowpath 239 into the one or more conduits 290, as detailed further below. In the embodiment of FIG. 2A, the one or more conduits 290 include a first conduit 290a and a second conduit 290b. The first conduit 290a is located upstream of the HP compressor 24 and the second conduit 290b is located downstream of the HP turbine 28. The one or more conduits 290 may include any number of conduits located anywhere along the core turbine engine 216 for providing fluid communication with the LP shaft flowpath 239.

The cooling system 211 includes one or more pumps 292. The one or more pumps 292 are in fluid communication with the one or more conduits 290. FIG. 2A shows only one pump 292. The pump 292 is in fluid communication with the first conduit 290a. The one or more pumps 292 may include any number of pumps in fluid communication with any of the one or more conduits 290. The one or more pumps 292 provide pressurized cooling air (e.g., positive pressure) through the one or more conduits 290, into the LP shaft flowpath 239, through the LP shaft apertures 247 and the HP shaft apertures 241, and into the one or more cavities 225, as detailed further below. In some embodiments, the one or more pumps 292 provide a suction action such that the one or more pumps 292 suck or draw hot air from the one or more cavities 225, as detailed below. The one or more pumps 292 include one or more valves 294 associated therewith. The one or more valves 294 are active valves such that an operational state (e.g., opened or closed) of the one or more valves 294 is controlled by a controller 296, as detailed further below. The one or more valves 294 open to allow the one or more pumps 292 to pump air into, or out of, the one or more conduits 290. The one or more valves 294 close to prevent air flow through the one or more conduits 290.

The one or more pumps 292 are actively controlled such that, for example, the controller 296 controls a flow of cooling air (e.g., an amount of cooling air, a speed of cooling air, or both) from the one or more pumps 292. The controller 296 also controls the operational state (e.g., opened or closed) of the one or more valves 294 and controls the one or more valves 294 between opened or closed to control the amount of cooling air or the speed of cooling air into, or out of, the one or more conduits 290. Any suitable means may be used to control the flow of cooling air from the one or more pumps 292, including, for example, the one or more valves 294.

The controller 296 may be a standalone controller part of an engine controller configured to operate various systems of the cooling system 211. In this embodiment, the controller 296 is a computing device having one or more processors 295 and a memory 297. The processor 295 can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory 297 can include one or more computer-readable media, including, but not limited to, non-transitory computer-readable media, a computer readable non-volatile medium (e.g., a flash memory), a RAM, a ROM, hard drives, flash drives, or other memory devices.

The memory 297 can store information accessible by the processor 295, including computer-readable instructions that can be executed by the processor 295. The instructions can be any set of instructions or a sequence of instructions that, when executed by the processor 295, cause the processor 295 and the controller 296 to perform operations. The controller 296 and, more specifically, the processor 295 is programed or configured to perform these operations, such as the operations discussed further below. In some embodiments, the instructions can be executed by the processor 295 to cause the processor 295 to complete any of the operations and functions for which the controller 296 is configured, as will be described further below. The instructions can be software written in any suitable programming language or can be implemented in hardware. Additionally, or alternatively, the instructions can be executed in logically or virtually separate threads on the processor 295. The memory 297 can further store data that can be accessed by the processor 295.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The controller 296 is communicatively coupled to one or more sensors 298 that measure various operating conditions of the turbine engine 210, such as, for example, but not limited to, thermal conditions of the HP compressor 24 and engine parameters of the turbine engine 210. The one or more sensors 298 include sensors for measuring the thermal conditions of the HP compressor 24 (or another input from which the controller 296 can determine the thermal conditions of the HP compressor 24). The thermal conditions of the HP compressor 24 include, for example, temperature of air in the HP compressor 24.

The one or more sensors 298 include sensors for measuring the engine parameters, such as, sensors for measuring engine shutdown time, sensors for measuring thrust reverser operation, sensors for measuring power setting before thrust reverse, sensors for measuring engine ground idle duration during shutdown of the turbine engine 210, or sensors for measuring ambient conditions outside of the turbine engine 210. The sensors for measuring the engine parameters of the turbine engine 210 may include other inputs from which the controller 296 can determine the engine parameters. The engine shutdown time is the instance when the fuel is cut from the turbine engine 210 to shutdown. The thrust reverser operation includes an operational state and deployment of a thrust reverser of the turbine engine 210 to apply an aerodynamic brake to the aircraft. The power setting before thrust reverse includes a power setting (e.g., cruise or hold) of the turbine engine 210 before the thrust reverser is activated. The engine ground idle duration before shutdown includes an amount of time that the turbine engine 210 is idle prior to shutdown of the turbine engine 210. The ambient conditions include an ambient temperature and the altitude or an ambient pressure.

The controller 296 is configured to receive an input from the one or more sensors 298 indicating the measured thermal conditions of the HP compressor 24 and the measured engine parameters of the turbine engine 210, and the controller 296 is configured to activate the one or more pumps 292 or actuate the one or more valves 294 based on the measured thermal conditions of the HP compressor 24 and the measured engine parameters of the turbine engine 210, as detailed further below.

FIG. 2A shows the turbine engine 210 in an operating state. When the turbine engine 210 is operating, the HP turbine rotor blades 70 of the HP turbine 28 rotate, thus, causing the HP shaft 234 to rotate, which in turn causes the HP compressor rotor blades 23 of the HP compressor 24 to rotate, as detailed above with respect to FIG. 1. The LP turbine 30 (FIG. 1) similarly rotates, thus, causing the LP shaft 236 to rotate, which in turn rotates the LP compressor 22. Thus, during operation of the turbine engine 210, the components rotate about the longitudinal centerline 12 (e.g., clockwise or counterclockwise), as detailed above. Rotation of the LP shaft 236 generates a centrifugal force that causes the one or more valves 280 to close (e.g., as shown and described with respect to FIG. 3A) such that air does not pass through the LP shaft apertures 247 or the HP shaft apertures 241, as detailed further below. Thus, when the turbine engine 210 is operating, the one or more valves 280 are closed. During such operation of the turbine engine 210, cooling air 265 is provided through the LP shaft 236 (e.g., through the LP shaft flowpath 239). Similarly, cooling air 267 and/or cooling air 269 is provided to the one or more cavities 225. For example, the cooling air 265 and/or the cooling air 267 is provided from bleed air or discharge air from the inlet portion and/or upstream stages of the HP compressor 24. The cooling air 269 is provided from bleed air or discharge air from downstream stages of the HP compressor 24. Thus, the cooling air 269 is provided at a higher pressure relative to the pressure of the cooling air 265 and/or the cooling air 267. When the one or more valves 280 are closed, the cooling air 265 is prevented from passing through the LP shaft apertures 247 and the HP shaft apertures 241 and into the one or more cavities 225. Similarly, the cooling air 267 and the cooling air 269 is prevented from passing through the LP shaft apertures 247 and the HP shaft apertures 241. The locations of the one or more valves 280 shown in FIG. 2A (e.g., the first valves 280a in the LP shaft 236 and the second valves 280b in the HP shaft 234) are selected to prevent backflow of the cooling air within the cavities 225 due to a pressure differential between the cooling air 269 from the downstream stages of the HP compressor 24 and the cooling air 267 from the inlet portion and/or the upstream stages of the HP compressor 24. During operation of the turbine engine 210, the one or more valves 294 are closed and the one or more pumps 292 are not active.

Figure 2B:
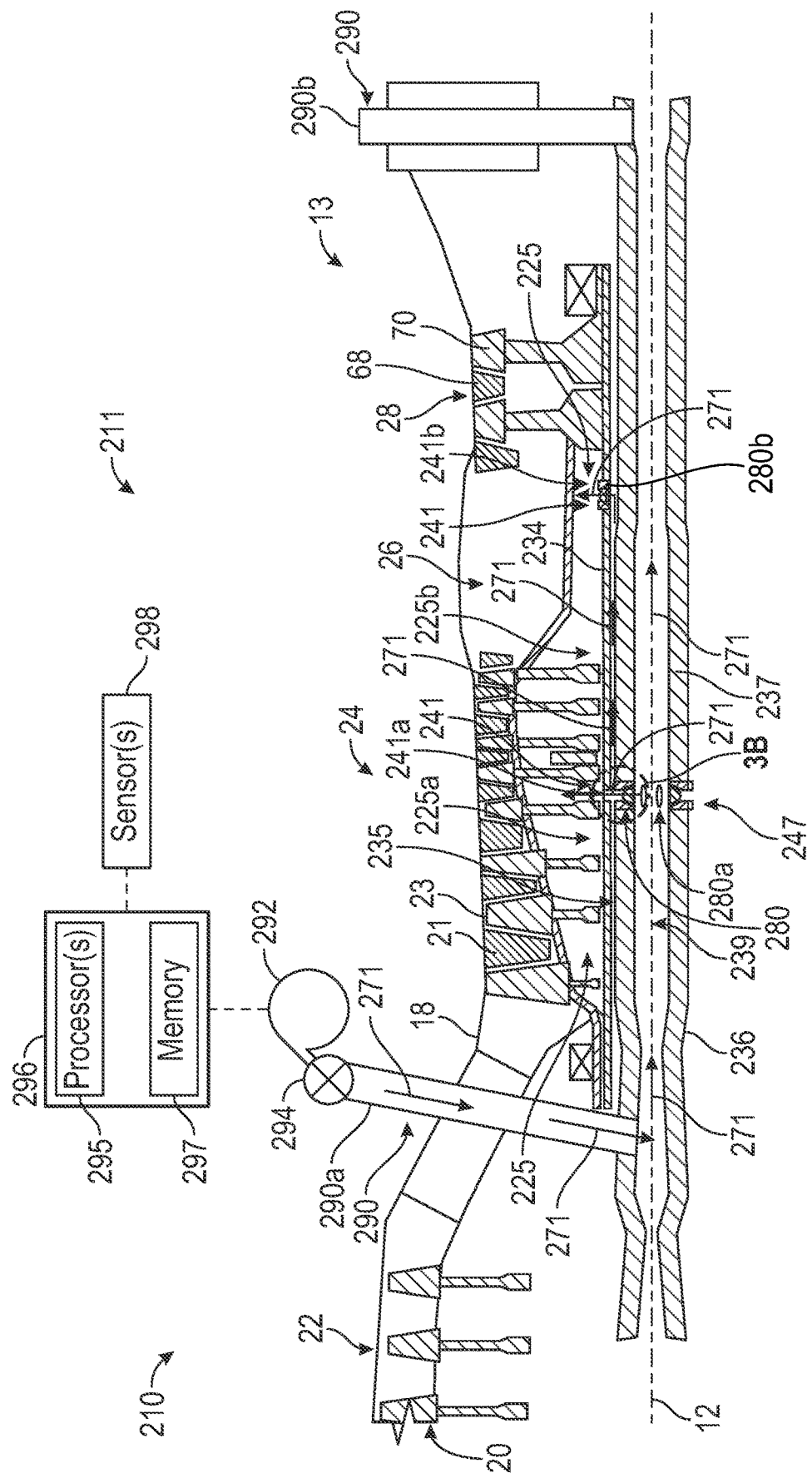
FIG. 2B is a partial schematic cross-sectional diagram of the cooling system of the core turbine engine of FIG. 2A during a shutdown of the turbine engine, according to an embodiment of the present disclosure.

FIG. 2B is a schematic cross-sectional diagram of the cooling system 211 of the core turbine engine 216. FIG. 2B shows the turbine engine 210 during a shutdown of the turbine engine 210. During the shutdown of the turbine engine 210, the HP shaft 234 and the LP shaft 236 stop rotating, which results in asymmetric heat distribution or thermal gradients circumferentially or axially along the HP shaft 234 or the LP shaft 236. Such a temperature gradient may cause the HP shaft 234 or the LP shaft 236 to experience non-uniform cooling around a circumference of the HP shaft 234 or a circumference of the LP shaft 236, or both the circumference of the HP shaft 234 and the circumference of the LP shaft 236. The non-uniform cooling causes a circumferential thermal gradient on the HP shaft 234 or the LP shaft 236 or both the HP shaft 234 and the LP shaft 236. The circumferential thermal gradient may result in rotor bow of the HP shaft 234 or of the LP shaft 236 or of both the HP shaft 234 and the LP shaft 236, as detailed above. For example, the thermal gradient may cause a portion of the HP shaft 234 or the LP shaft 236 or both the HP shaft 234 and the LP shaft 236 to bend along a radial direction, an axial direction, or a circumferential direction.

Thus, the cooling system 211 cools the HP compressor 24 during the shutdown of turbine engine 210 to limit, to prevent, or otherwise to reduce the non-uniform cooling of the HP shaft 234, the LP shaft 236, or both the HP shaft 234 and the LP shaft 236, thus limiting, preventing, or otherwise reducing the rotor bow of the HP shaft 234, the LP shaft 236, or both the HP shaft 234 and the LP shaft 236. The cooling system 211 ventilates the one or more cavities 225. For example, the one or more valves 280 open during the shutdown of the turbine engine 210 to allow cooling air into the one or more cavities 225, for example, of the core turbine engine 216. Gravitational force causes the valves 280 in the vertically upper portion 13 of the LP shaft 236 and of the HP shaft 234 to open when the LP shaft 236 and the HP shaft 234 stop rotating (e.g., the one or more valves 280 above the longitudinal centerline 12 in FIG. 2B when the turbine engine 210 stops operating), while the one or more valves 280 in the vertically lower portion 15 of the LP shaft 236 and of the HP shaft 234 remain closed (e.g., the one or more valves 280 below the longitudinal centerline 12 in FIG. 2B when the turbine engine 210 stops operating), as detailed further below. In some embodiments, a spring force causes all of the one or more valves 280 in the LP shaft 236 and in the HP shaft 234 to open when the LP shaft 236 and the HP shaft 234 stop rotating, as detailed further below.

During the shutdown, the controller 296 activates the one or more pumps 292 and opens the one or more valves 294 to supply cooling air 271 to the one or more cavities 225, as detailed further below. For example, the cooling system 211 operably directs the cooling air 271 through the one or more conduits 290, into the LP shaft 236 (e.g., into the LP shaft flowpath 239), through the LP shaft apertures 247 and the HP shaft apertures 241, and into the one or more cavities 225. In this way, the cooling system 211 cools the one or more cavities 225 of the core turbine engine 216 and reduces or prevents bowing (e.g., rotor bow) of the HP shaft 234 or of the LP shaft 236. The continuous supply of cooling air 271 to the one or more cavities 225 cools the components uniformly around the circumference to avoid, to prevent, or to reduce bowing.

When the turbine engine 210 is in an operating condition, the centrifugal force will again cause all of the one or more valves 280 to move to the closed position. Prior to operating the turbine engine 210 again, the controller 296 ceases operation of the one or more pumps 292 and closes the one or more valves 294. In this condition, the cooling air 271 will cease to flow. Any cooling air provided is the cooling air 265, the cooling air 267, or the cooling air 269 described with respect to FIG. 2A.

Figure 3A:
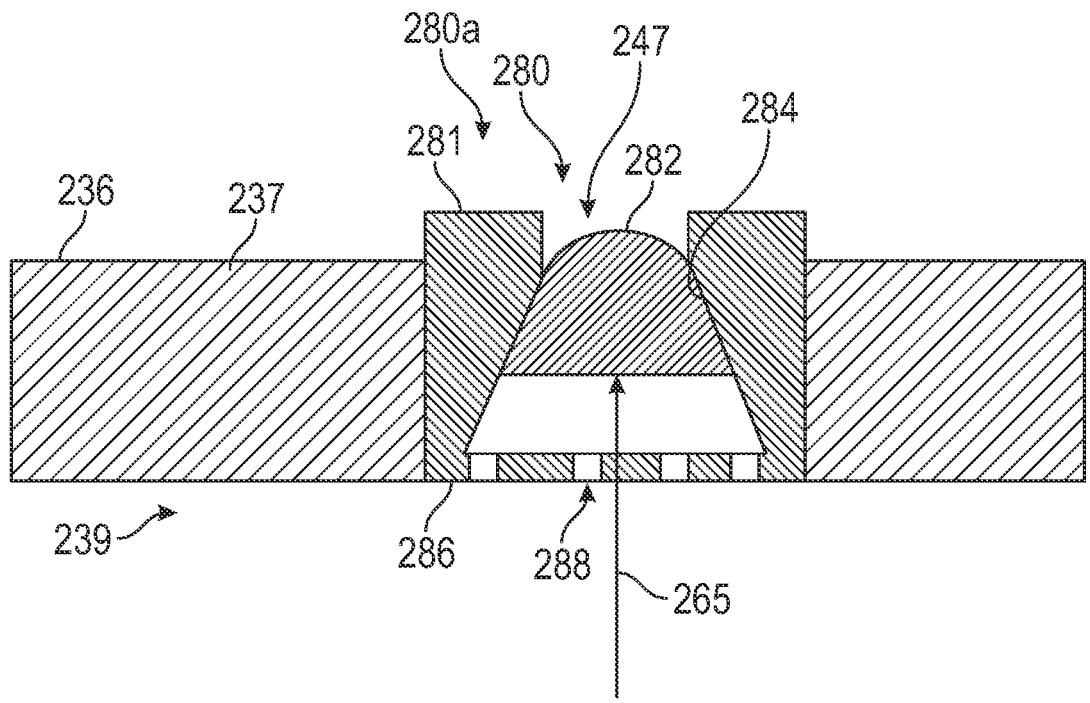
FIG. 3A is a schematic cross-sectional view, taken at detail 3A in FIG. 2A, of a valve of the cooling system in a closed state, according to an embodiment of the present disclosure.

FIG. 3A is a schematic cross-sectional view, taken at detail 3A in FIG. 2A, of a valve 280 of the cooling system 211 in a closed state. While the valve 280 in FIG. 3A is a first valve 280a of the LP shaft 236, the valve 280 described herein is applicable to the one or more second valves 280b of the HP shaft 234 and is applicable for all of the one or more valves 280. The valve 280 includes a valve body 281 and a valve member 282. The valve body 281 is disposed within the wall 237 of the LP shaft 236. The valve body 281 may be separate from the LP shaft 236 or may be formed integral with the LP shaft 236. The valve body 281 defines the LP shaft apertures 247. The valve body 281 also includes a valve seat 284 and a perforated wall 286. The valve seat 284 is a surface of the valve body 281 against which the valve member 282 rests when the valve 280 is in the closed state. The valve seat 284 may include any size or any shape that generally corresponds to a size or a shape of the valve member 282 such that the valve member 282 rests against the valve seat 284 to prevent air from passing through the valve 280 in the closed state. The perforated wall 286 includes one or more apertures 288, also referred to as valve apertures 288, extending therethrough such that the valve 280 is in fluid communication with the LP shaft flowpath 239. The valve member 282 may include any size or any shape, as desired, for closing the valve 280 and preventing air from passing through the valve 280 in the closed state. The valve member 282 may include any material, such as, for example, metal, ceramic, alloys, or the like When the turbine engine 210 (FIG. 2A) is in the operation mode, the centrifugal force of the LP shaft 236 causes the valve member 282 to rest against the valve seat 284 such that the valve member 282 prevents cooling air 267 from passing through the valve 280. In this way, the valve 280 prevents cooling air 267 from passing through the LP shaft apertures 247 and through the HP shaft apertures 241 (FIG. 2A), as detailed above. Since the LP shaft 236 is rotating and generating the centrifugal force, all of the valves 280 of the LP shaft 236 will be closed in the operation mode of FIG. 2A.

Figure 3B:
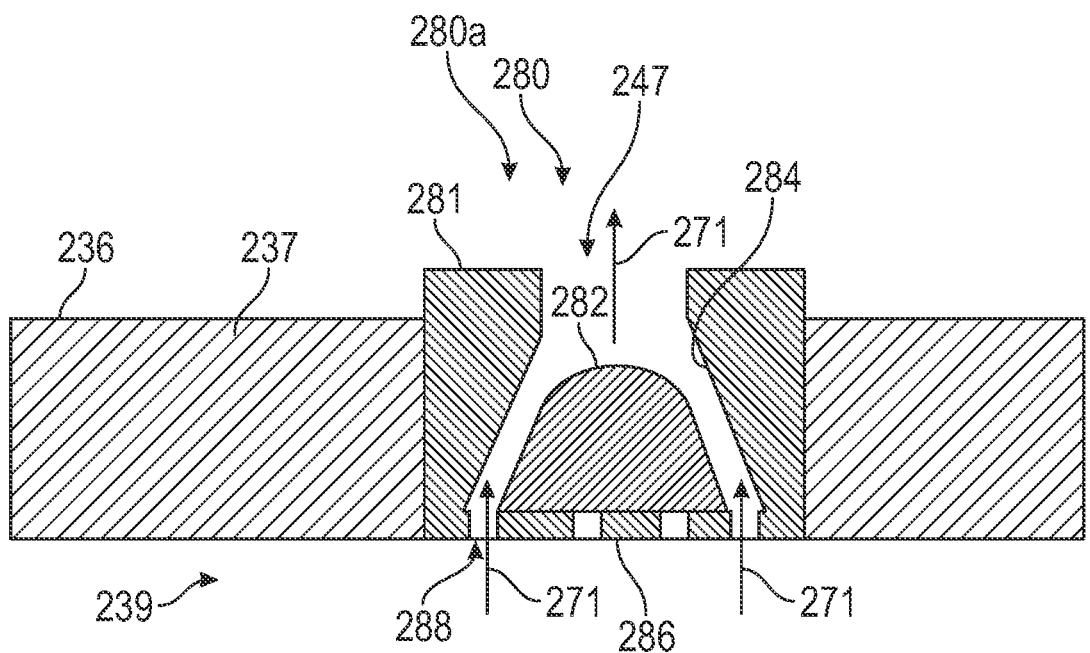
FIG. 3B is a schematic cross-sectional view, taken at detail 3B in FIG. 2B, of the valve of the cooling system in an open state, according to an embodiment of the present disclosure.

FIG. 3B is a schematic cross-sectional view, taken at detail 3B in FIG. 2B, of the valve 280 of the cooling system 211 in an open state. While the valve 280 in FIG. 3B is a first valve 280a of the LP shaft 236, the valve 280 described herein is applicable to the one or more second valves 280b of the HP shaft 234 and is applicable for all of the one or more valves 280. As shown in FIG. 3B, during shutdown of the turbine engine 210, the cooling system 211 ventilates the one or more cavities 225. For example, the centrifugal force ceases causing the valve member 282 to rest against the perforated wall 286 due to gravity. At least one of the valve apertures 288 is not blocked by the valve member 282 when the valve 280 is open. In this way, the valve 280 allows cooling air 271 to pass through the valve 280 (e.g., through the LP shaft apertures 247), through the HP shaft apertures 241 (FIG. 2B), and into the one or more cavities 225 (FIG. 2B). Thus, the cooling air 271 through the cooling system 211 cools the HP compressor 24 and other components of the core turbine engine 216, as detailed above, to prevent or to reduce rotor bow of the LP shaft 236 or of the HP shaft 234. When the centrifugal force ceases, gravity will cause the valve members 282 on the vertically upper portion 13 of the LP shaft 236 (e.g., vertically with respect to the ending position of the turbine engine 210 and generally the upper side of the longitudinal centerline 12 of FIG. 2B) to fall to rest against the perforated wall 286. The valve members 282 on the vertically lower portion 15 of the LP shaft 236 will also fall due to gravity, but these valves 280 are located below the longitudinal centerline 12 and, thus, the valves 280 are in an orientation one hundred eighty degrees of that shown in FIGS. 3A and 3B, resulting in the valves 280 on the vertically lower portion 15 to remain in the closed position shown in FIG. 3A.

Figure 4A:
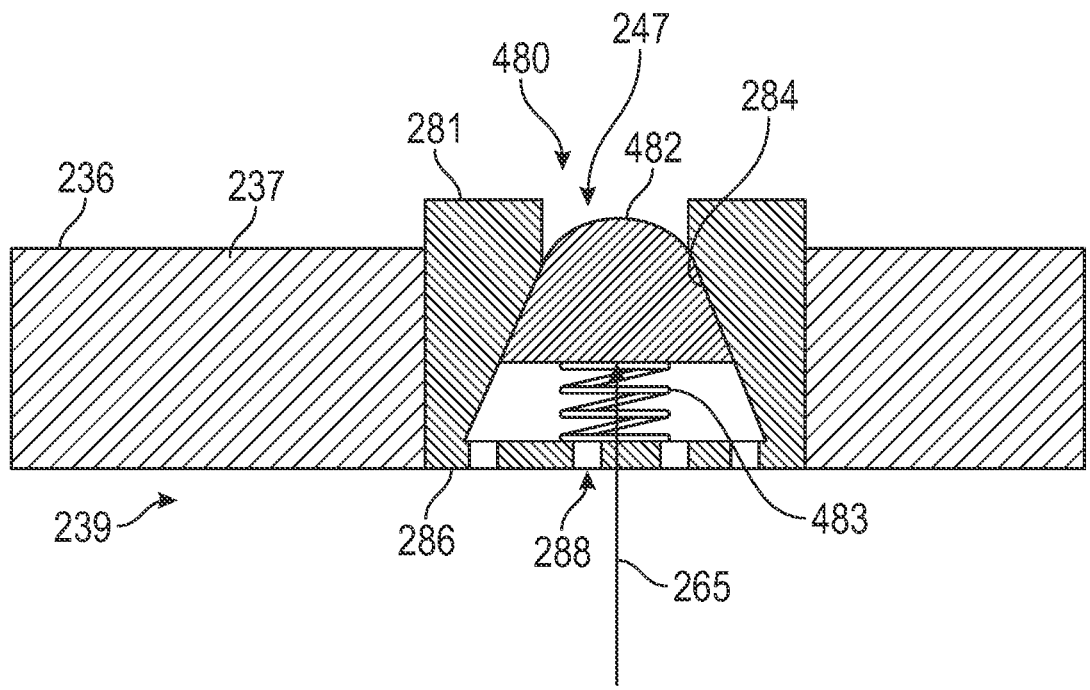
FIG. 4A illustrates another valve in a closed state, according to another embodiment of the present disclosure.

FIG. 4A illustrates a valve 480 in a closed state, according to another embodiment. The valve 480 includes many of the same or similar components as the valve 280 (FIGS. 3A and 3B) and may be utilized in the turbine engine 210 (FIGS. 2A and 2B). The valve 480 includes a valve member 482 and a biasing member 483. As used herein, a "biasing member" includes a resilient, rigid, semi-rigid, flexible, or elastic member, and may be formed of any material, such as, for example, metals, polymers, plastics, elastomers, composite materials, rubber, or the like. In the embodiment of FIG. 4A, the biasing member 483 is a spring. In this way, the valve 480 is considered to be spring-loaded. The biasing member 483 includes any resilient, rigid, semi-rigid, flexible, or elastic member, and may be formed of any material, such as, for example, metals, polymers, plastics, elastomers, composite materials, rubber, or the like. The biasing member 483 is coupled to the valve member 482 at a first end and is coupled to the perforated wall 286 at a second end. FIG. 4A shows the biasing member 483 in an extended state. Accordingly, during operation of the turbine engine 210, the biasing member 483 extends as the valve member 482 is moved to rest against the valve seat 284 due to the centrifugal force.

Figure 4B:
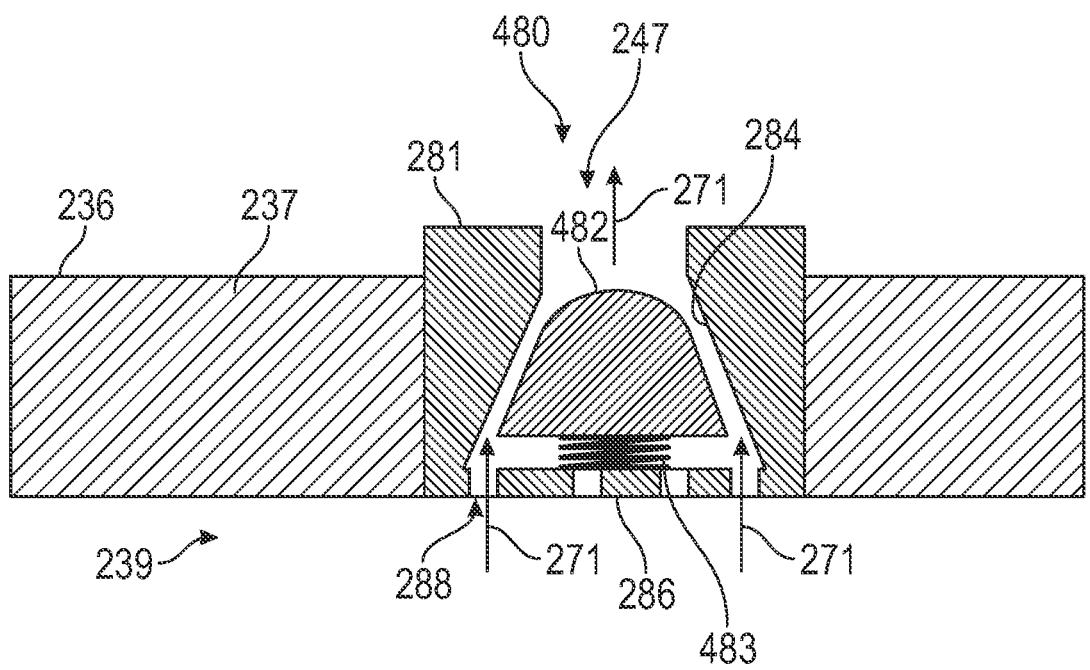
FIG. 4B illustrates the valve of FIG. 4A in an open state, according to an embodiment of the present disclosure.

FIG. 4B illustrates the valve 480 in an open state. FIG. 4B shows the biasing member 483 in a compressed state when the valve 480 is open. The biasing member 483 is biased to the compressed state such that the biasing member 483 pulls the valve member 482 from the closed state to the open state during the shutdown of the turbine engine 210 (e.g., when the LP shaft 236 and the HP shaft 234 stop rotating) (FIGS. 2A and 2B). In this way, all of the valves 480 disposed in the LP shaft 236 (FIGS. 2A and 2B) and/or in the HP shaft 234 (FIGS. 2A and 2B) are moved to the open state during the shutdown of the turbine engine 210.

Figure 5A:
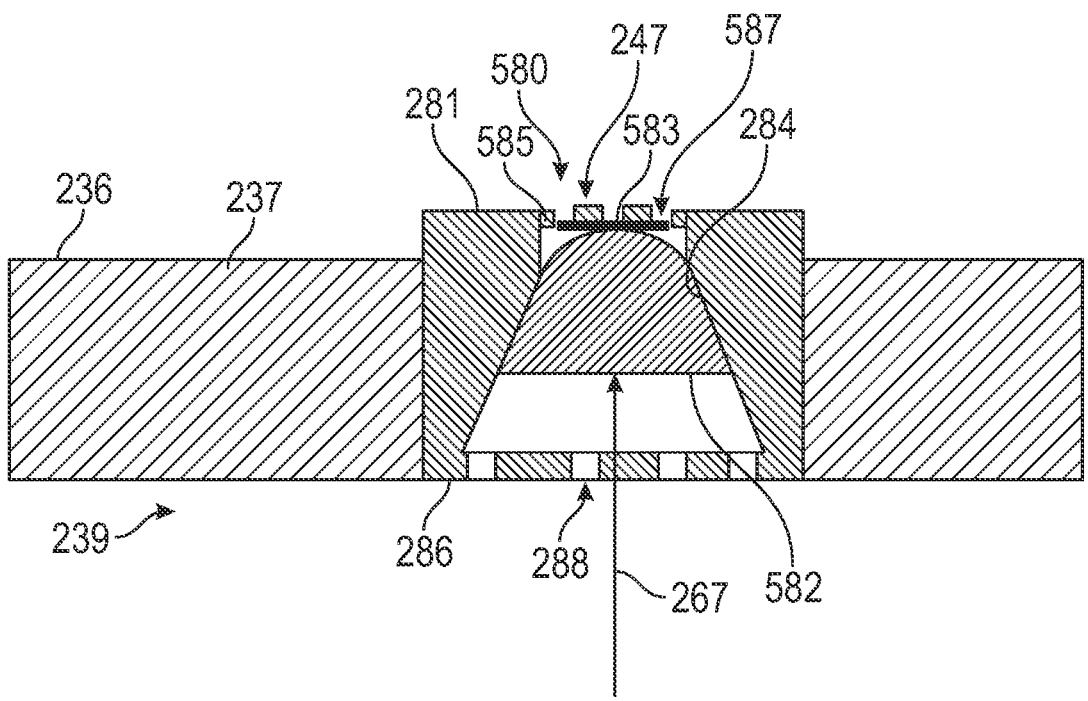
FIG. 5A illustrates another valve in a closed state, according to another embodiment of the present disclosure.

FIG. 5A illustrates a valve 580 in a closed state, according to another embodiment. The valve 580 includes many of the same or similar components as the valve 480 (FIGS. 4A and 4B) and may be utilized in the turbine engine 210 (FIGS. 2A and 2B). The valve 580 includes a valve member 582 and a biasing member 583. In the embodiment of FIG. 5A, the biasing member 583 is a spring. In this way, the valve 580 is considered to be spring-loaded. The valve 580 also includes a segmented wall 585 disposed at a radially outer end thereof. The segmented wall 585 includes one or more second valve apertures 587 extending therethrough such that the valve 580 is in fluid communication with the HP shaft flowpath 235 (FIGS. 2A and 2B). The biasing member 583 is coupled to the valve member 582 at a first end and is coupled to the segmented wall 585 at a second end. FIG. 5A shows the biasing member 583 in a compressed state. Accordingly, during operation of the turbine engine 210, the biasing member 583 compresses as the valve member 582 is moved to rest against the valve seat 284 due to the centrifugal force.

Figure 5B:
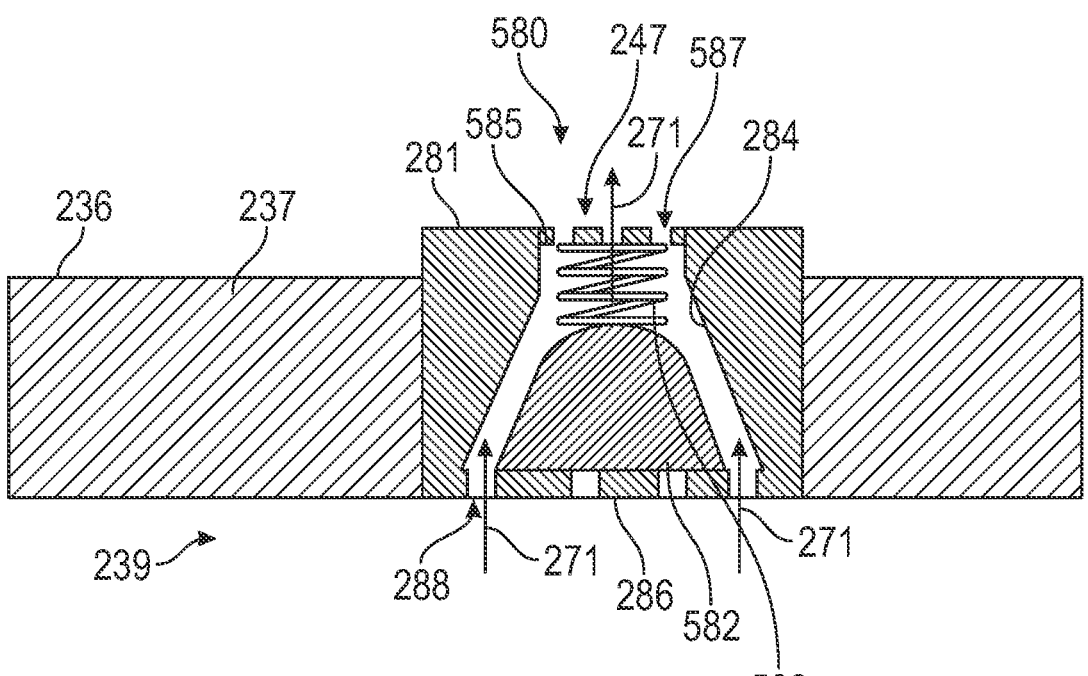
FIG. 5B illustrates the valve of FIG. 5A in an open state, according to an embodiment of the present disclosure.

FIG. 5B illustrates the valve 580 in an open state. FIG. 5B shows the biasing member 583 in an expanded state when the valve 580 is open. The biasing member 583 is biased to the expanded state such that the biasing member 583 pushes the valve member 582 from the closed state to the open state during the shutdown of the turbine engine 210 (e.g., when the LP shaft 236 and the HP shaft 234 stop rotating) (FIGS. 2A and 2B). In this way, all of the valves 580 disposed in the LP shaft 236 (FIGS. 2A and 2B) and/or in the HP shaft 234 (FIGS. 2A and 2B) are moved to the open state during the shutdown of the turbine engine 210.

Figure 6A:
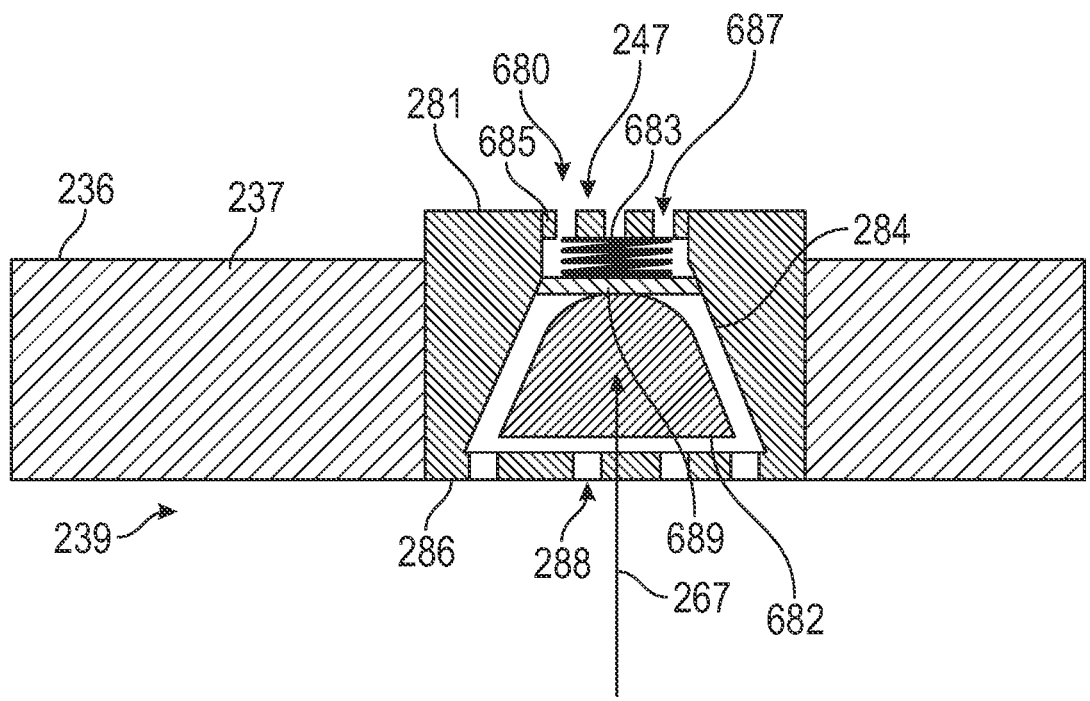
FIG. 6A illustrates another valve in a closed state, according to another embodiment of the present disclosure.

FIG. 6A illustrates a valve 680 in a closed state, according to another embodiment. The valve 680 includes many of the same or similar components as the valve 580 (FIGS. 5A to 5B) and may be utilized in the turbine engine 210 (FIGS. 2A and 2B). The valve 680 includes a valve member 682 and a biasing member 683. In the embodiment of FIG. 6A, the biasing member 683 is a spring. In this way, the valve 680 is considered to be spring-loaded. The valve 680 also includes a segmented wall 685 disposed at a radially outer end thereof. The segmented wall 685 includes one or more second valve apertures 687 extending therethrough such that the valve 680 is in fluid communication with the HP shaft flowpath 235 (FIGS. 2A and 2B). The biasing member 683 is coupled to a cap member 689 at a first end and is coupled to the segmented wall 685 at a second end. The cap member 689 is coupled to the valve member 682 at a radially outer portion of the valve member 682. The cap member 689 includes a greater diameter than a diameter of the valve member 682 at the radially outer portion of the valve member 682. FIG. 6A shows the biasing member 683 in a compressed state. Accordingly, during operation of the turbine engine 210, the biasing member 683 compresses as the valve member 682 is moved to the closed position due to the centrifugal force. When the biasing member 683 compresses, the cap member 689 is moved to rest against the valve seat 284 to close the valve 680.

Figure 6B:
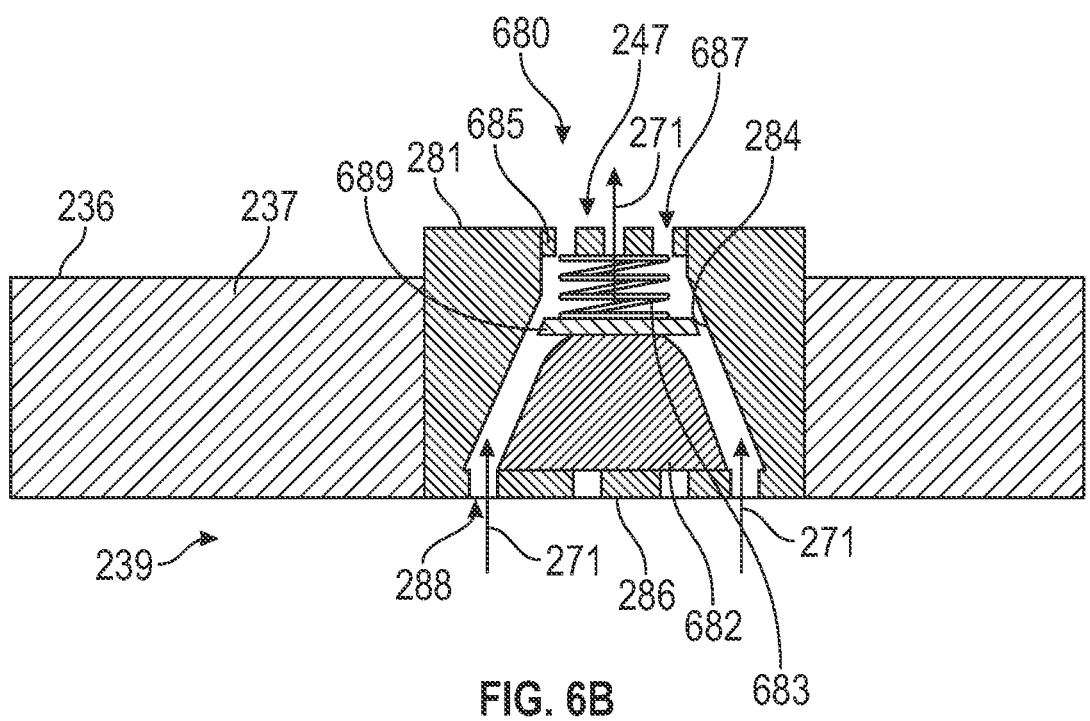
FIG. 6B illustrates the valve of FIG. 6A in an open state, according to an embodiment of the present disclosure.

FIG. 6B illustrates the valve 680 in an open state. FIG. 6B shows the biasing member 683 in an expanded state when the valve 680 is open. The biasing member 683 is biased to the expanded state such that the biasing member 683 pushes the valve member 682 and the cap member 689 from the closed state to the open state during the shutdown of the turbine engine 210 (e.g., when the LP shaft 236 and the HP shaft 234 stop rotating) (FIGS. 2A and 2B). In this way, all of the valves 680 disposed in the LP shaft 236 (FIGS. 2A and 2B) and/or in the HP shaft 234 (FIGS. 2A and 2B) are moved to the open state during the shutdown of the turbine engine 210.

Figure 7A:
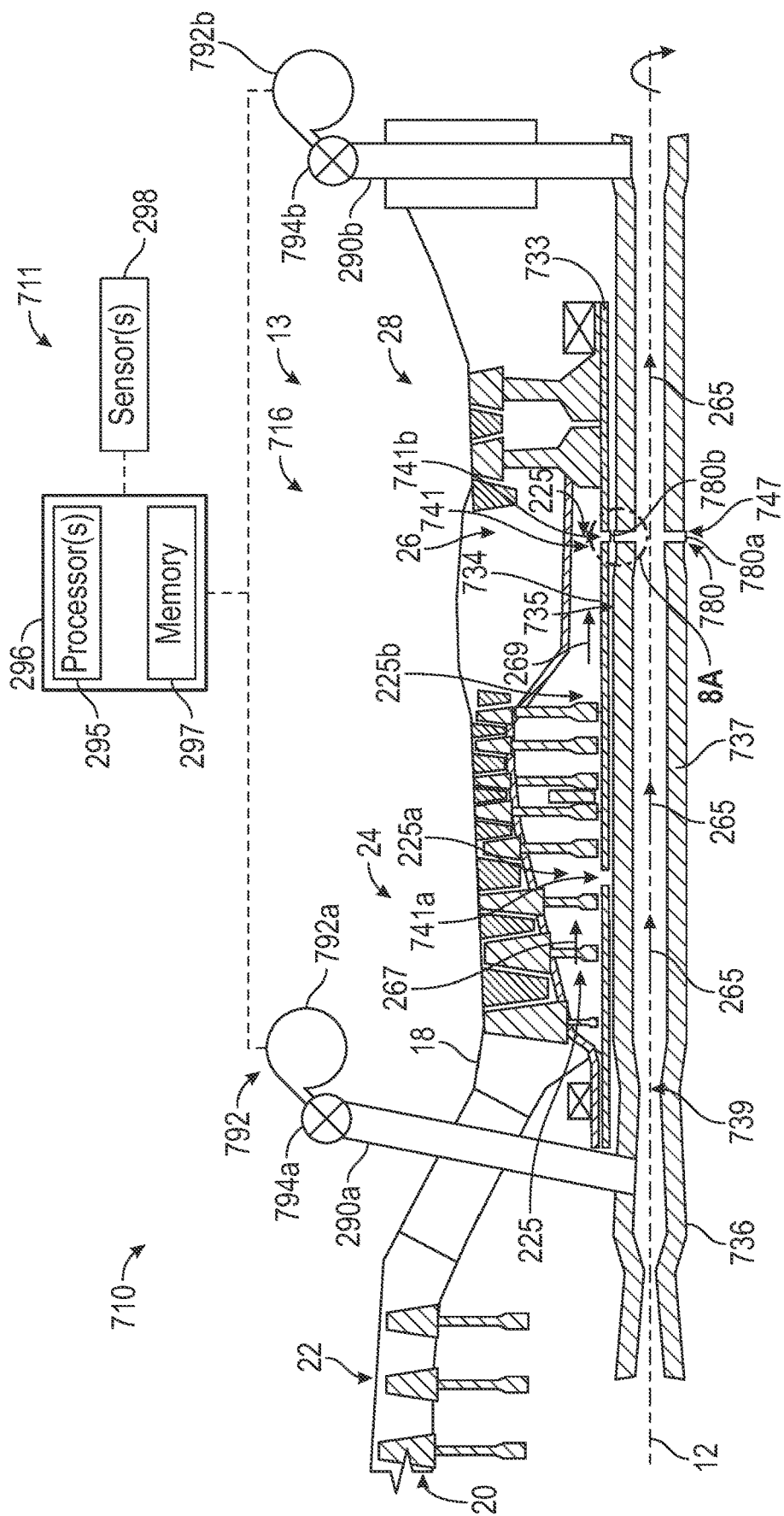
FIG. 7A is a partial schematic cross-sectional diagram of a core turbine engine, taken along a longitudinal centerline of the turbine engine having a cooling system and during operation of the turbine engine, according to another embodiment of the present disclosure.

FIG. 7A is a schematic cross-sectional diagram of another core turbine engine 716 for a turbine engine 710 having a cooling system 711, according to an embodiment of the present disclosure. FIG. 7A shows the turbine engine 710 in an operating mode. The core turbine engine 716 may be used in the turbine engine 10 of FIG. 1. The embodiment of FIG. 7A includes many of the same or similar components and functionality as the embodiment shown in FIG. 2A. The same or similar reference numeral is used for the same or similar components in these two embodiments, and a detailed description of these components and functionality is omitted here. Some reference numerals have been removed for clarity.

The cooling system 711 includes an HP shaft 734 and an LP shaft 736. The HP shaft 734 is an annular hollow shaft. The HP shaft 734 includes a wall 733 that defines an HP shaft flowpath 735. The LP shaft 736 is disposed within the HP shaft 734 such that the HP shaft flowpath 735 is defined between the wall 733 and the LP shaft 736. The cooling system 711 includes one or more HP shaft apertures 741 in the HP shaft 734. The one or more HP shaft apertures 741 include a plurality of HP shaft apertures 741 positioned circumferentially about the HP shaft 734. In the embodiment of FIG. 7A, the HP shaft apertures 741 include first HP shaft apertures 741a and second HP shaft apertures 741b. The first HP shaft apertures 741a are located on the HP shaft 734 to provide fluid communication between the HP shaft 734 and the first cavity 225a. The second HP shaft apertures 741b are located on the HP shaft 734 to provide fluid communication between the HP shaft 734 and the second cavity 225b. In this way, the second HP shaft apertures 741b is located downstream of the first HP shaft apertures 741a. Thus, air can flow through the HP shaft apertures 741 and into the one or more cavities 225, as detailed further below.

The LP shaft 736 is an annular hollow shaft that includes a wall 737 that defines an LP shaft flowpath 739. The LP shaft 736 includes one or more LP shaft apertures 747. The LP shaft apertures 747 provide fluid communication between the LP shaft 736 and the first cavity 225a and the second cavity 225b. The LP shaft apertures 747 generally axially align with the HP shaft apertures 741. For example, the LP shaft apertures 747 generally axially align with the second HP shaft apertures 741b. In this manner, fluid (e.g., air) flows through the LP shaft flowpath 739 into the one or more cavities 225 via the aligned LP shaft apertures 747 and the HP shaft apertures 741.

The LP shaft 736 and the HP shaft 734 include one or more valves, also referred to as sleeves 780. In the embodiment of FIG. 7A, the one or more sleeves 780 are disposed in the HP shaft flowpath 735 between the LP shaft 736 and the HP shaft 734. The one or more sleeves 780 are annular sleeves and are disposed about an outer surface of the LP shaft 736 and about an outer surface of the HP shaft 734. The one or more sleeves 780 include a size and a shape for sealing the LP shaft apertures 747 and for sealing the HP shaft apertures 741 (e.g., the second HP shaft apertures 741b). In the embodiment of FIG. 7A, the one or more sleeves 780 include a generally cylindrical shape. For example, the one or more sleeves 780 include a generally cylindrical sleeve disposed about the LP shaft 736 and disposed about the HP shaft 734. In this way, the one or more sleeves 780 block and seal the LP shaft apertures 747 and the HP shaft apertures 741 in the closed position of FIG. 7A. In the embodiment of FIG. 7A, the one or more sleeves 780 are passive valves in which an operational state of the one or more sleeves 780 is controlled by gravitational force and/or centrifugal force, as detailed further below. The one or more sleeves 780 may include active valves that are actuated by a controller to control the operational state of the one or more sleeves 780. In the embodiment of FIG. 7A, the one or more sleeves 780 include a first sleeve 780a and a second sleeve 780b. The first sleeve 780a is disposed on the LP shaft 736 and is associated with the LP shaft apertures 747 and. The second sleeve 780b is disposed on the HP shaft 734 and is associated with the second HP shaft apertures 741b.

The cooling system 711 includes one or more pumps 792 including a first pump 792a in fluid communication with the first conduit 290a and a second pump 792b in fluid communication with the second conduit 290b. The first pump 792a includes a first valve 794a and the second pump 792b includes a second valve 794b. The controller 296 controls the first pump 792a, the second pump 792b, the first valve 794a, and the second valve 794b, as detailed above.

When the turbine engine 710 is operating, the HP shaft 734 and the LP shaft 736 rotate, as detailed above. FIG. 7A shows the one or more valves 280 and the one or more sleeves 780 are in a closed state during operation of the turbine engine 710. In the closed state, the one or more first sleeves 780a prevent the cooling air 265 in the LP shaft flowpath 739 from passing through the LP shaft apertures 747. In the closed state, the one or more second sleeves 780b prevent a backflow of cooling air in the cavities 225 due to a pressure difference between the cooling air 269 and the cooling air 267, as detailed above. During operation of the turbine engine 710, the first valve 794a and the second valve 794b are closed and the first pump 792a and the second pump 792b are not active.

Figure 7B:
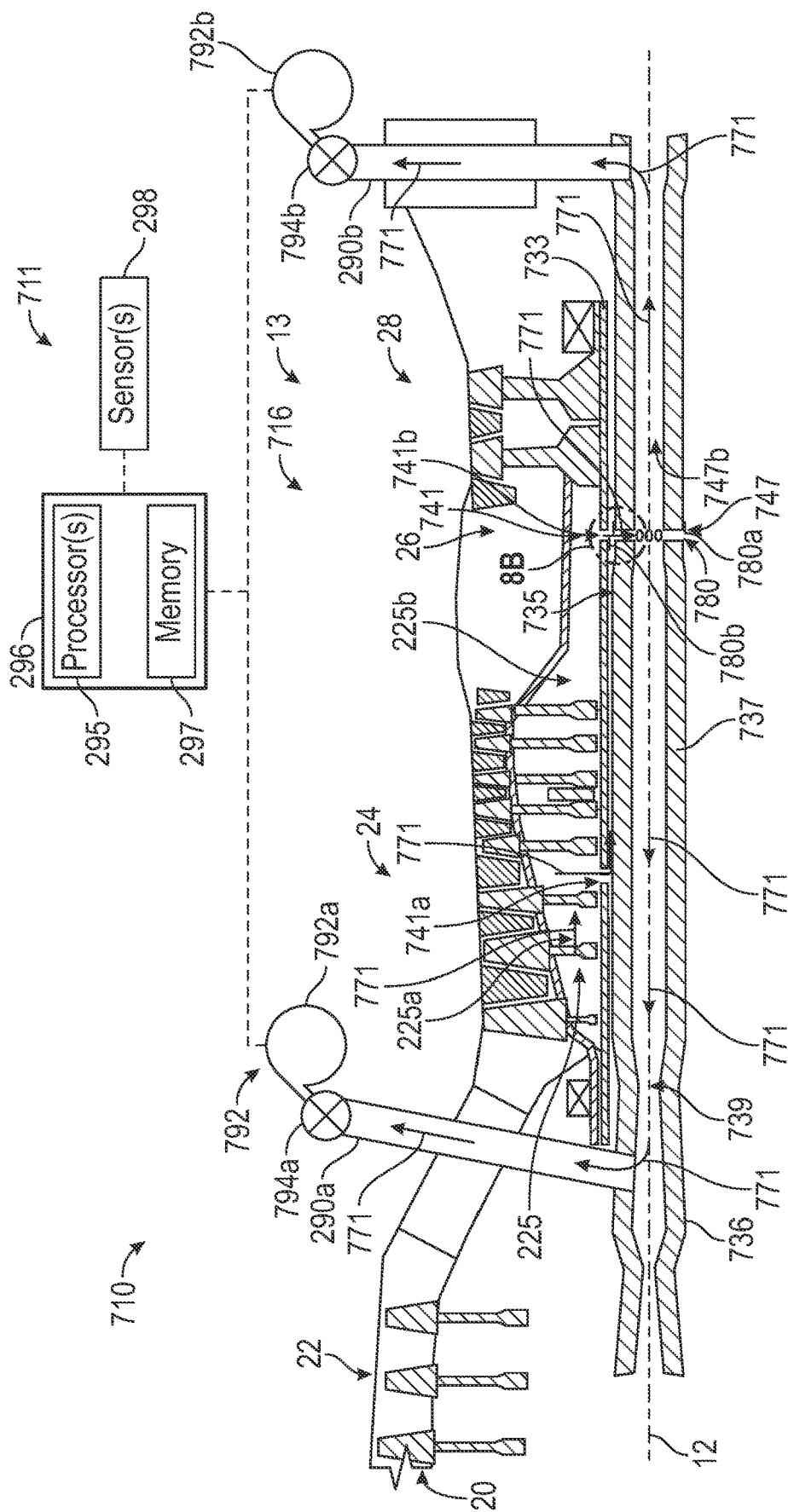
FIG. 7B is a partial schematic cross-sectional diagram of the cooling system of the core turbine engine of FIG. 7A during a shutdown of the turbine engine, according to another embodiment of the present disclosure.

FIG. 7B is a schematic cross-sectional diagram of the cooling system 711 of the core turbine engine 716. FIG. 7B shows the turbine engine 710 during a shutdown of the turbine engine 710. As shown in FIG. 7B, during the shutdown of the turbine engine 710, the HP shaft 734 and the LP shaft 736 stop rotating, and rotor bow may occur, as detailed above. Thus, during the shutdown, the cooling system 711 ventilates the one or more cavities 225. For example, the one or more sleeves 780 open during the shutdown of the turbine engine 710 to allow hot air to be removed from the one or more cavities 225 (or to allow cooling air into the one or more cavities 225). Mechanical force causes the one or more sleeves 780 to open, as detailed further below.

During the shutdown, the controller 296 activates the first pump 792a and the second pump 792b and opens the first valve 794a and the second valve 794b to provide suction in the LP shaft 736. The first pump 792a and the second pump 792b provide a vacuum to draw hot air from the one or more cavities 225. For example, the first pump 792a and the second pump 792b draw hot air 771 from the first cavity 225a and from the second cavity 225b. The hot air 771 is operably directed through the HP shaft apertures 741 and the LP shaft apertures 747, into the LP shaft flowpath 739 of the LP shaft 736, through the first conduit 290a and the second conduit 290b, and removed via the first pump 792a and the second pump 792b, respectively. In this way, the one or more cavities 225 are cooled and bowing or bending of the HP shaft 734 or of the LP shaft 736 is reduced or prevented. The continuous removal of hot air 771 from the one or more cavities 225 cools the components uniformly around the circumference to avoid, to prevent, or to reduce bowing. In some embodiments, the first pump 792a or the second pump 792b, or both the first pump 792a and the second pump 792b, provide cooling air rather than vacuuming, as detailed above with respect to FIG. 2B.

FIG. 8A is a schematic cross-sectional diagram of a portion of the cooling system 711, taken at detail 8A of FIG. 7A. FIG. 8A shows the one or more sleeves 780 are each coupled to one or more actuators 806. The one or more actuators 806 are passive actuation devices that are controlled by a mechanical force and/or by centrifugal force to control the operating state of the one or more sleeves 780. In some embodiments, the actuators 806 may be controlled by a controller to control the operating state of the one or more sleeves 780. The actuators 806 includes a first actuator 806a for actuating the first sleeve 780a and a second actuator 806b for actuating the second sleeve 780b.

Each actuator 806 includes a base member 807, an arm 808, a mass 809, and a biasing member 813. The base member 807 is coupled to the wall of the respective shaft. For example, the base member 807 of the first actuator 806a is coupled to the wall 737 of the LP shaft 736 and the base member 807 of the second actuator 806b is coupled to the wall 733 of the HP shaft 734. The biasing member 813 is coupled to the base member 807. The arm 808 is coupled to the biasing member 813 at a first pivot 814 of the arm 808 and is coupled to a respective sleeve 780 at a first end of the arm 808 at a second pivot 815. For example, the arm 808 of the first actuator 806a is coupled to the first sleeve 780a and the arm 808 of the second actuator 806b is coupled to the second sleeve 780b. The mass 809 is coupled to the arm 808 at a second end of the arm 808. The arm 808 includes a third pivot 817 located axially between the biasing member 813 and the sleeve 780. The arm 808 includes three components coupled together at the respective pivots 814, 815, 817 to form the arm 808. For example, the arm 808 includes a first arm 808a between the mass 809 and the first pivot 814, a second arm 808b between the first pivot 814 and the third pivot 817, and a third arm 808c between the third pivot 817 and the second pivot 815. In this way, each component of the arm 808 (e.g., the first arm 808a, the second arm 808b, and the third arm 808c) can move individually about the respective pivots 814, 815, 817, as detailed further below.

FIG. 8A shows the sleeves 780 are in a closed state during operation of the turbine engine 710 when the HP shaft 734 and the LP shaft 736 rotate. In the closed state, the sleeves 780 prevent the cooling air 265 from passing through the LP shaft apertures 747 and through the second HP shaft apertures 741b. As the LP shaft 736 and the HP shaft 734 rotate, centrifugal force (as shown by the arrows 861) causes the mass 809 of the actuators 806 to move radially outward. As the mass 809 moves radially outward, the arm 808 pivots about the first pivot 814, the second pivot 815, and the third pivot 817 such that each component of the arm 808 moves and the arm 808 extends and pushes the sleeves 780 to the closed position. In this way, the sleeves 780 slide to seal the respective apertures. For example, the first sleeve 780a seals the LP shaft apertures 747 and the second sleeve 780b seals the second HP shaft apertures 741b. Thus, the sleeves 780 prevent air from passing through the LP shaft apertures 747 and the second HP shaft apertures 741b.

FIG. 8B is a schematic cross-sectional diagram of a portion of the cooling system 711, taken at detail 8B of FIG. 7B. FIG. 8B shows the cooling system 711 during a shutdown of the turbine engine 710. During the shutdown of the turbine engine 710, the LP shaft 736 and the HP shaft 734 stop rotating, and rotor bow may occur, as detailed above. Thus, during the shutdown, the cooling system 711 ventilates the one or more cavities 225 (FIG. 7A). For example, the one or more sleeves 780 open during the shutdown to allow hot air to be removed from the one or more cavities 225 (FIG. 7A) (or to allow cooling air into the one or more cavities 225), as detailed above. The biasing member 813 of the actuators 806 pulls the arm 808 such that each component of the arm 808 moves and the arm 808 pivots about the first pivot 814, the second pivot 815, and the third pivot 817. In this way, the biasing member 813 pulls the arm 808 towards the base member 807 and the arm 808, thus, pulls the sleeve 780 such that the sleeve 780 slides axially to open the respective apertures. For example, the first sleeve 780a slides axially to uncover and to open the LP shaft apertures 747 and the second sleeve 780b slides axially to uncover and to open the second HP shaft apertures 741b. One or more pumps (e.g., the first pump 792a or the second pump 792b of FIGS. 7A and 7B) provide a vacuum to draw hot air from the one or more cavities 225 (FIG. 7A), as detailed above.

Figure 9A:
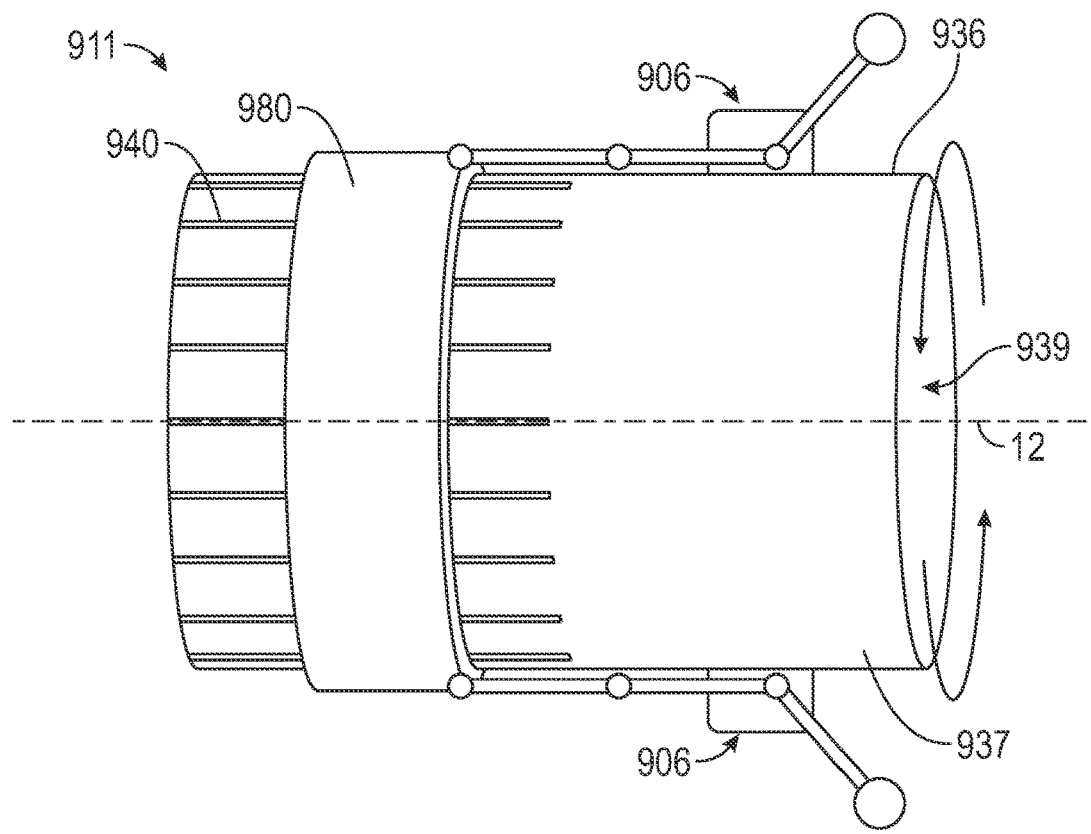
FIG. 9A is a side view of a portion of another cooling system for a turbine engine, according to another embodiment of the present disclosure.

FIG. 9A is a side view of a portion of another cooling system 911, according to another embodiment. FIG. 9A shows an LP shaft 936 of a turbine engine. The LP shaft 936 and the cooling system 911 may be incorporated into the cooling system 211 (FIG. 2A) and the turbine engine 210 (FIG. 2A), described above. FIG. 9A shows the LP shaft 936 in an operating mode during operation of the turbine engine. The embodiment of FIG. 9A includes many of the same or similar components and functionality as the embodiment shown in FIG. 2A.

The LP shaft 936 is an annular hollow shaft and includes a wall 937 that defines an LP shaft flowpath 939. The wall 937 is annular about the longitudinal centerline 12. The cooling system 911 includes one or more LP shaft apertures 947 (FIG. 9B) in the LP shaft 936. The one or more LP shaft apertures 947 include a plurality of LP shaft apertures 947 positioned circumferentially about the LP shaft 936 to provide fluid communication between the LP shaft flowpath 939 and the one or more cavities 225 (FIG. 7A), as detailed above.

The LP shaft 936 includes one or more valves, also referred to as sleeves 980 (only one of which is shown in FIG. 9A). In the embodiment of FIG. 9A, the sleeves 980 are annular sleeves that are disposed about a radially outer surface of the LP shaft 936. In this way, the sleeves 980 are positioned between the wall 937 of the LP shaft 936 and the wall 733 (FIG. 7A) of the HP shaft 734 (FIG. 7A). The LP shaft 936 includes one or more splines 940 disposed circumferentially about the radially outer surface of the LP shaft 936. The one or more splines 940 extend axially along the LP shaft 936 and extend forward of the LP shaft apertures 947 and aft of the LP shaft apertures 947. The sleeves 980 include corresponding splines on a radially inner surface thereof that mate with the one or more splines 940. In this way, the sleeves 980 are prevented from rotating or from sliding circumferentially about the LP shaft 936. One or more actuators 906 are coupled to the one or more sleeves 980. FIG. 9A shows two such actuators 906, but the LP shaft 936 can include any number of actuators 906 as desired. The one or more actuators 906 are mounted to the LP shaft 936, as detailed further below.

When the turbine engine is operating, the LP shaft 936 rotates. FIG. 9A shows the sleeves 980 in a closed state during operation of the turbine engine. As the LP shaft 936 rotates, centrifugal force causes the actuators 906 to push the sleeves 980 to the closed position to cover or to block the LP shaft apertures 947 and the sleeves 980 slide along the splines 940 to the closed position, as detailed further below.

Figure 9B:
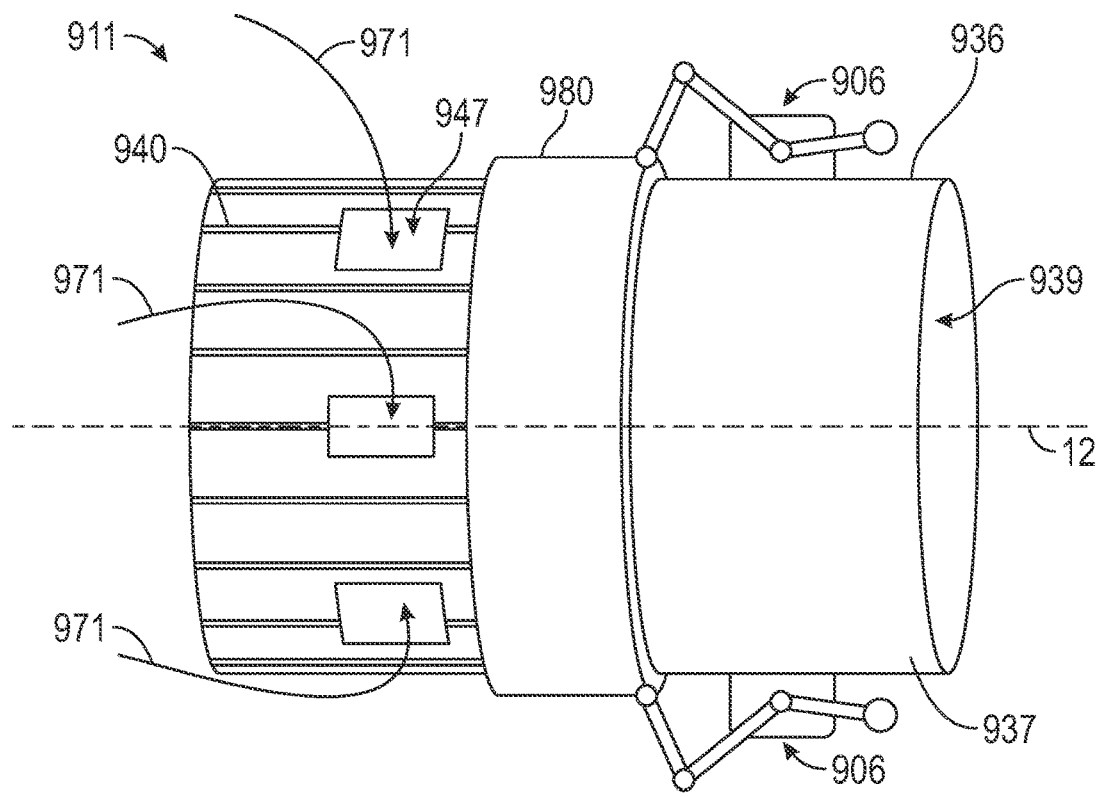
FIG. 9B is a side view of the portion of the cooling system of FIG. 9B during a shutdown of the turbine engine, according to another embodiment of the present disclosure.

FIG. 9B is a side view of a portion of the cooling system 911. FIG. 9B shows the cooling system 911 during a shutdown of the turbine engine. During the shutdown, the LP shaft 936 stops rotating, and rotor bow may occur, as detailed above. Thus, during the shutdown, the cooling system 911 ventilates the one or more cavities 225 (FIG. 7A). For example, the sleeves 980 open during the shutdown to allow hot air 971 to be removed from the one or more cavities 225 (FIG. 7A) (or to allow cooling air into the one or more cavities 225), as detailed above. The actuators 906 pull the sleeves 980 to the open position to uncover the LP shaft apertures 947 and the sleeves 980 slide along the splines 940 to the open position, as detailed further below.

Figure 10A:
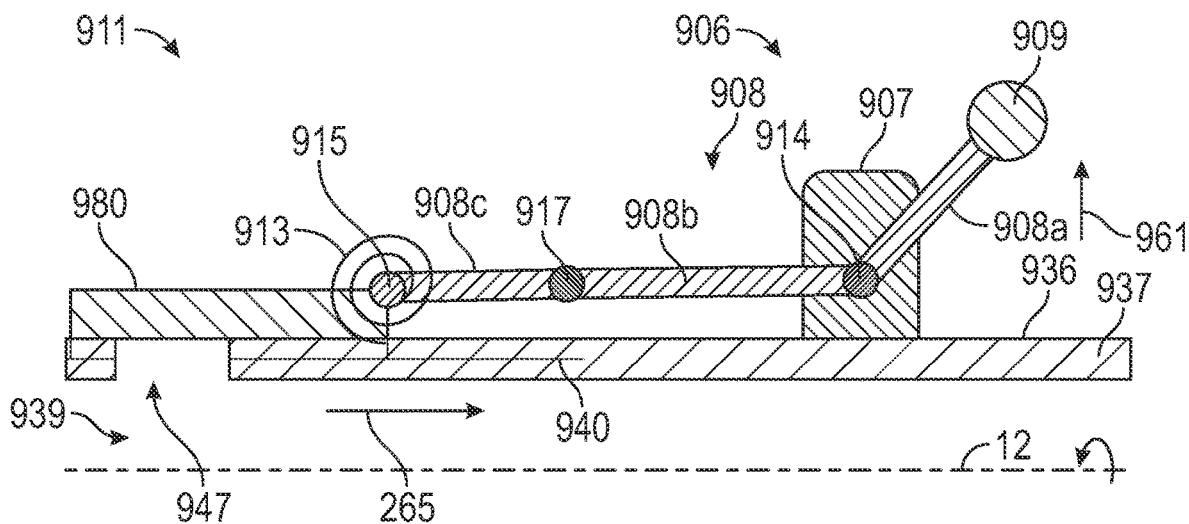
FIG. 10A is a partial schematic cross-sectional diagram of the cooling system of FIG. 9A, taken along a longitudinal centerline of the turbine engine, according to an embodiment of the present disclosure.

FIG. 10A is a schematic cross-sectional view of a portion of the cooling system 911 in FIG. 9A, taken along the longitudinal centerline 12. FIG. 10A shows the cooling system 911 during operation of the turbine engine. FIG. 10A shows the actuator 906 includes a base member 907, an arm 908, a mass 909, and a biasing member 913. The base member 907 is coupled to the radially outer surface of the wall 937 of the respective shaft. The biasing member 913 is coupled to the sleeve 980. In the embodiment of FIG. 10A, the biasing member 913 is a spring. The arm 908 is coupled to the base member 907 at a first pivot 914 of the arm 908 and is coupled to a respective sleeve 980 at a first end of the arm 908 at a second pivot 915. The mass 909 is coupled to the arm 908 at a second end of the arm 908. The arm 908 includes a third pivot 917 located axially between the sleeve 980 and the base member 907. The arm 908 includes three components coupled together at the respective pivots 914, 915, 917 to form the arm 908. For example, the arm 908 includes a first arm 908a between the mass 909 and the first pivot 914, a second arm 908b between the first pivot 914 and the third pivot 917, and a third arm 908c between the third pivot 917 and the second pivot 915. In this way, each component of the arm 908 (e.g., the first arm 908a, the second arm 908b, and the third arm 908c) can move individually about the respective pivots 914, 915, 917.

In operation, the LP shaft 936 rotates and centrifugal force (as shown by the arrow 961) causes the mass 909 of the actuator 906 to move radially outward. As the mass 909 moves radially outward, the arm 908 pivots about the first pivot 914, the second pivot 915, and the third pivot 917 such that the arm 908 extends and pushes the sleeve 980 to the closed position, as detailed above. In this way, the sleeve 980 slides along the splines 940 to cover and to seal the LP shaft apertures 947. Thus, the sleeve 980 prevents the cooling air 265, the cooling air 267 (FIG. 2A), and the cooling air 269 (FIG. 2A) from passing through the LP shaft apertures 947.

Figure 10B:
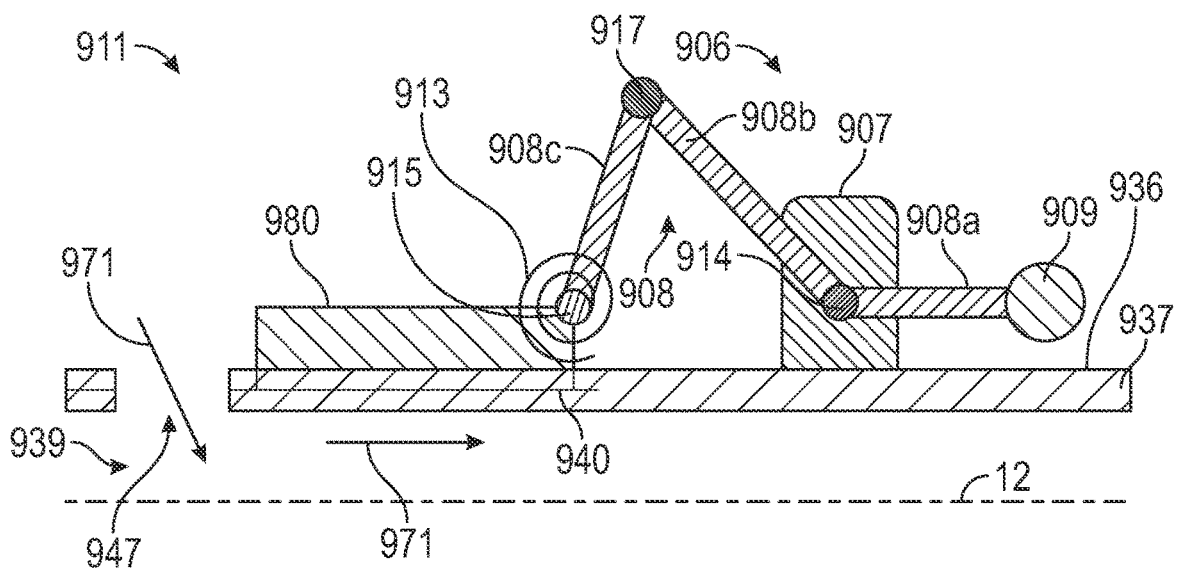
FIG. 10B is a partial schematic cross-sectional diagram of the cooling system of FIG. 9B, taken along a longitudinal centerline of the turbine engine, according to an embodiment of the present disclosure.

FIG. 10B is a schematic cross-sectional view of a portion of the cooling system 911 in FIG. 9B, taken along the longitudinal centerline 12. FIG. 10B shows the cooling system 911 during the shutdown of the turbine engine. During the shutdown, the LP shaft 936 stops rotating, as detailed above. The biasing member 913 pushes the arm 908 such that the arm 908 pivots about the first pivot 914, the second pivot 915, and the third pivot 917. In this way, the arm 908 pulls the sleeve 980 towards the base member 907 such that the sleeve 980 slides axially to open and to uncover the LP shaft apertures 947. One or more pumps provide a vacuum to remove the hot air 971 from the one or more cavities (FIG. 2A), as detailed above. The continuous removal of the hot air 971 from the one or more cavities 225 (FIG. 2A) cools the components uniformly around the circumference to avoid, to prevent, or to reduce bowing. In some embodiments, one or more pumps provide cooling air rather than vacuuming, as detailed above with respect to FIG. 2B.

Figure 11A:
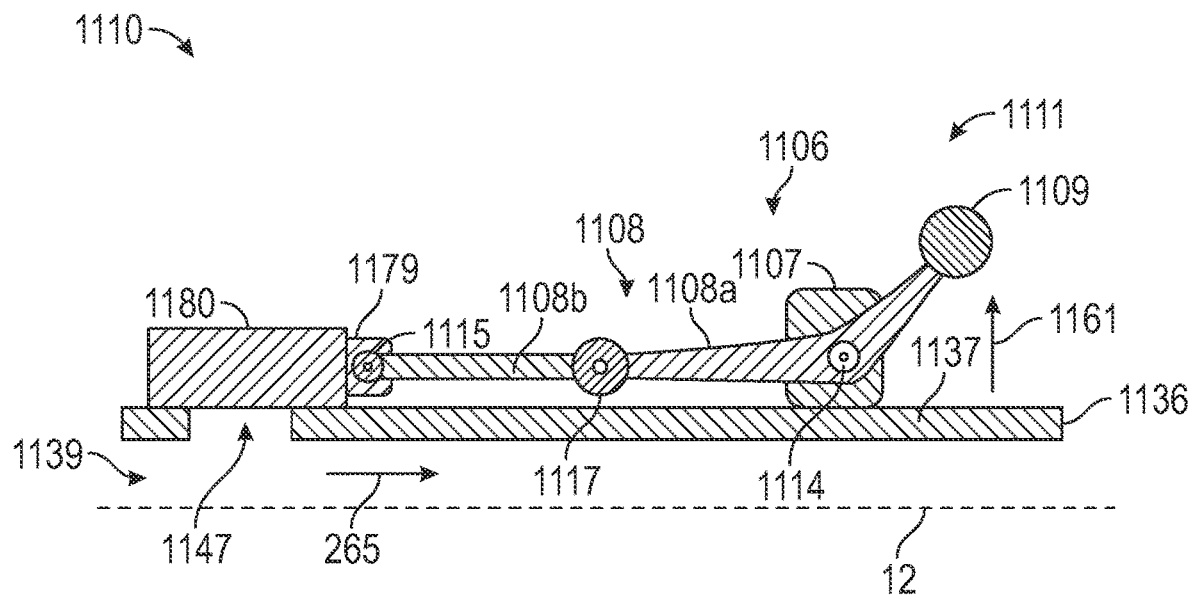
FIG. 11A is a partial schematic cross-sectional diagram of another cooling system for a turbine engine, taken along a longitudinal centerline of the turbine engine, according to another embodiment of the present disclosure.

FIG. 11A is a schematic cross-sectional view of a portion of a cooling system 1111 for a turbine engine 1110, taken along a longitudinal centerline 12 of the turbine engine 1110, according to another embodiment. The cooling system 1111 may be incorporated into the cooling system 211 (FIG. 2A) and the turbine engine 210 (FIG. 2A), described above. FIG. 11A shows the cooling system 1111 during operation of the turbine engine 1110. The embodiment of FIG. 11A includes many of the same or similar components and functionality as the embodiments shown in FIGS. 2A, 9A, and 10A. The cooling system 1111 includes an LP shaft 1136 having a wall 1137 and one or more LP shaft apertures 1147. The LP shaft 1136 is a hollow shaft defining an LP shaft flowpath 1139. A sleeve 1180 is disposed about the LP shaft 1136 to close and to seal the one or more LP shaft apertures 1147, thus sealing the LP shaft 1136 during operation of the turbine engine 1110.

The cooling system 1111 includes an actuator 1106 including a base member 1107, an arm 1108, a mass 1109, and a connection member 1179. The base member 1107 is coupled to the radially outer surface of the wall 1137 of an LP shaft 1136. The connection member 1179 is coupled to the sleeve 1180. The arm 1108 is coupled to the base member 1107 at a first pivot 1114 of the arm 1108 and is coupled to the connection member 1179 at a first end of the arm 1108 at a second pivot 1115. In some embodiments, the second pivot 1115 includes a biasing member to bias the sleeve 1180 to the open position, as detailed above with respect to FIGS. 10A and 10B. The mass 1109 is coupled to the arm 1108 at a second end of the arm 1108. The arm 1108 includes a third pivot 1117 located axially between the sleeve 1180 and the base member 1107. The arm 1108 includes two components including a first arm 1108a and a second arm 1108b. In this way, the first arm 1108a is a single component and extends from the mass 1109 to the third pivot 1117. The first arm 1108a is coupled to the base member 1107 by the first pivot 1114 such that the first arm 1108a can pivot or move about the first pivot 1114. The second arm 1108b is a single component and extends from the third pivot 1117 to the second pivot 1115. In this way, the second arm 1108b moves or pivots about the third pivot 1117 and moves the sleeve 1180 to open and close the LP shaft apertures 1147.

In operation, the LP shaft 1136 rotates and centrifugal force (as shown by arrow 1161) causes the mass 1109 of the actuator 1106 to move radially outward. As the mass 1109 moves radially outward, the arm 1108 pivots about the first pivot 1114, the second pivot 915, and the third pivot 1117 such that the arm 1108 extends and pushes the sleeve 1180 to the closed position, as detailed above. In this way, the sleeve 1180 slides along LP shaft 1136 to cover and to seal the LP shaft apertures 1147. Thus, the sleeve 1180 prevents the cooling air 265, the cooling air 267 (FIG. 2A), and the cooling air 269 (FIG. 2A) from passing through the LP shaft apertures 1147.

Figure 11B:
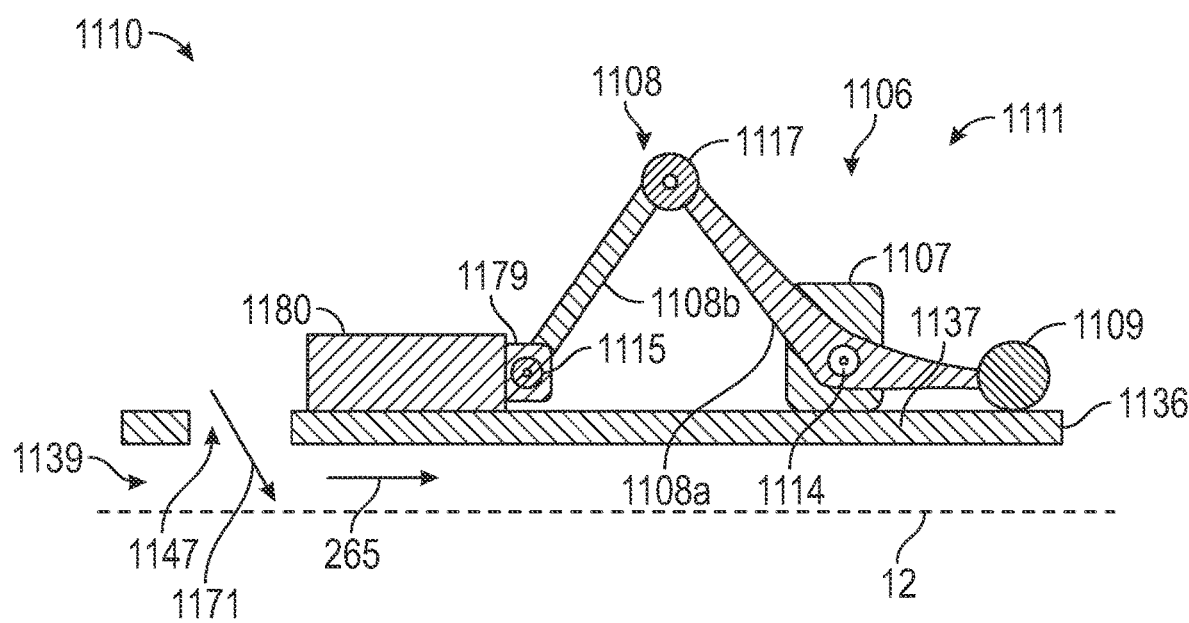
FIG. 11B is a partial schematic cross-sectional diagram of the cooling system of FIG. 11B during a shutdown of the turbine engine, according to an embodiment of the present disclosure.

FIG. 11B is a schematic cross-sectional view of a portion of the cooling system 1111 during a shutdown of the turbine engine 1110. During the shutdown, the LP shaft 1136 stops rotating, as detailed above. Gravity causes the mass 1109 to move downward such that the arm 1108 pivots about the first pivot 1114, the second pivot 1115, and the third pivot 1117, as detailed above. In this way, the arm 1108 pulls the sleeve 1180 towards the base member 1107 such that the sleeve 1180 slides axially to open and to uncover the LP shaft apertures 1147. In some embodiments, a biasing member helps to pivot the arm 1108, as detailed above. One or more pumps provide a vacuum to remove hot air 1171 from the one or more cavities 225 (FIG. 2A), as detailed above. The continuous removal of the hot air 1171 from the one or more cavities 225 (FIG. 2A) cools the components uniformly around the circumference to avoid, to prevent, or to reduce bowing. In some embodiments, one or more pumps provide cooling air rather than vacuuming, as detailed above with respect to FIG. 2B.

Figure 12A:
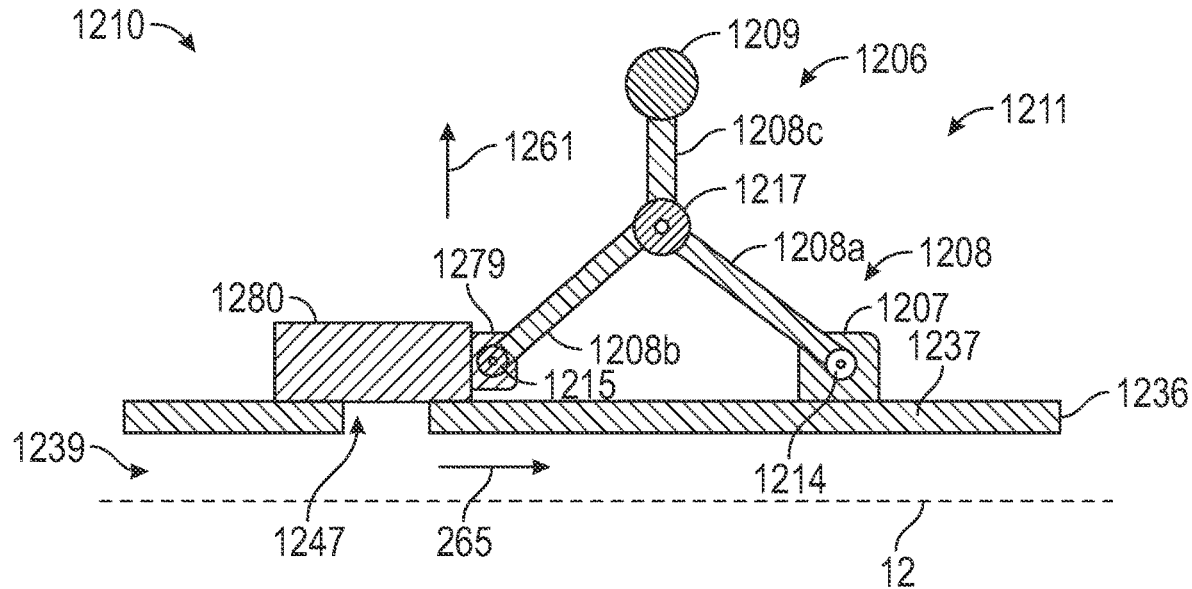
FIG. 12A is a partial schematic cross-sectional diagram of another cooling system for a turbine engine, taken along a longitudinal centerline of the turbine engine, according to another embodiment of the present disclosure.

FIG. 12A is a schematic cross-sectional view of a portion of a cooling system 1211 for a turbine engine 1210, taken along a longitudinal centerline 12 of the turbine engine 1210, according to another embodiment. The cooling system 1211 may be incorporated into the cooling system 211 (FIG. 2A) and the turbine engine 210 (FIG. 2A), described above. FIG. 12A shows the cooling system 1211 during operation of the turbine engine 1210. The embodiment of FIG. 12A includes many of the same or similar components and functionality as the embodiments shown in FIGS. 2A, 9A, 10A, and 11A. The cooling system 1211 includes an LP shaft 1236 having a wall 1237 and one or more LP shaft apertures 1247. The LP shaft 1236 is a hollow shaft defining an LP shaft flowpath 1239. A sleeve 1280 is disposed about the LP shaft 1236 to close and to seal the one or more LP shat apertures 1247, thus sealing the LP shaft 1236 during operation of the turbine engine 1210.

The cooling system 1211 includes an actuator 1206 including a base member 1207, an arm 1208, a mass 1209, and a connection member 1279. The base member 1207 is coupled to the radially outer surface of the wall 1237 of the LP shaft 1236. The connection member 1279 is coupled to the sleeve 1280. The arm 1208 includes three components including a first arm 1208a, a second arm 1208b, and a third arm 1208c. The first arm 1208a is coupled at a first end to the base member 1207 at a first pivot 1214 and the second arm 1208b is coupled at a first end to the connection member 1279 at a second pivot 1215. In some embodiments, the second pivot 1215 includes a biasing member to bias the sleeve 1280 to the open position, as detailed above with respect to FIGS. 10A and 10B. The first arm 1208a and the second arm 1208b are coupled together at a second end respectively thereof at a third pivot 1217. The mass 1209 is coupled to the third arm 1208c at a first end of the third arm 1208c. The third arm 1208c is coupled at a second end to the first arm 1208a and to the second arm 1208b at the third pivot 1217. In this way, the first arm 1208a can pivot or move about the first pivot 1214 and the third pivot 1217, and the second arm 1208b can move or pivot about the second pivot 1215 and the third pivot 1217. Thus, the arm 1208 moves the sleeve 1280 to open and close the LP shaft apertures 1247.

In operation, the LP shaft 1236 rotates and centrifugal force (as shown by arrow 1261) causes the mass 1209 of the actuator 1206 to move radially outward. As the mass 1209 moves radially outward, the arm 1208 pivots about the first pivot 1214, the second pivot 1215, and the third pivot 1217 such that the arm 1208 contracts and pulls the sleeve 1280 to the closed position. In this way, the sleeve 1280 slides along LP shaft 1236 to cover and to seal the LP shaft apertures 1247. Thus, the sleeve 1280 prevents the cooling air 265, the cooling air 267 (FIG. 2A), and the cooling air 269 (FIG. 2A) from passing through the LP shaft apertures 1247.

Figure 12B:
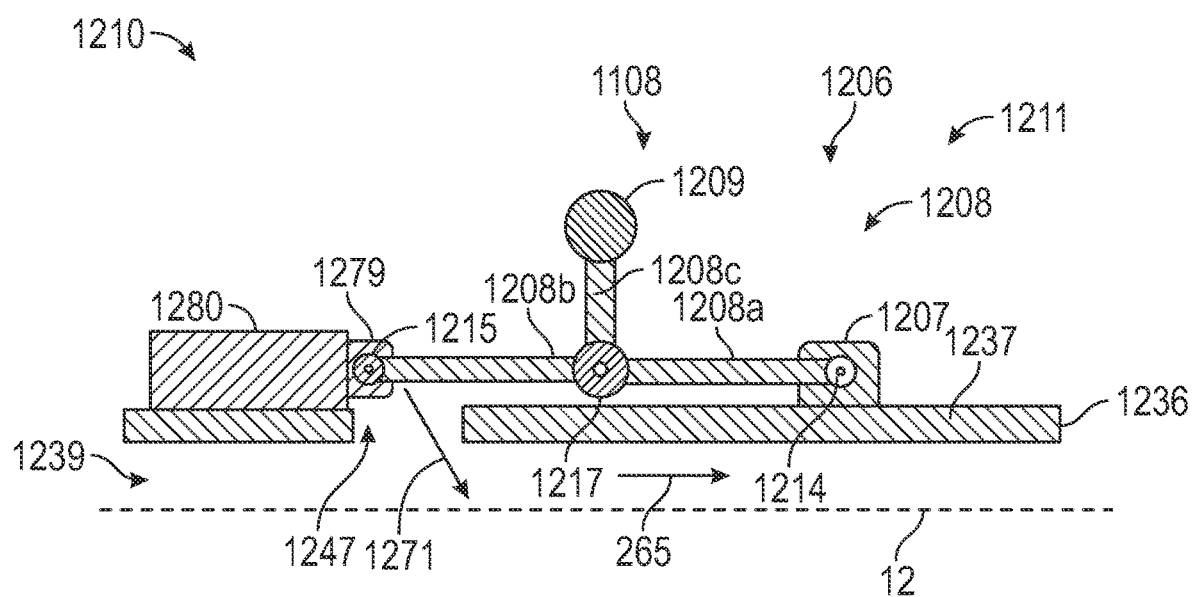
FIG. 12B is a partial schematic cross-sectional diagram of the cooling system of FIG. 12B during a shutdown of the turbine engine, according to an embodiment of the present disclosure.

FIG. 12B is a schematic cross-sectional view of a portion of the cooling system 1211 during a shutdown of the turbine engine 1210. During the shutdown, the LP shaft 1236 stops rotating, as detailed above. Gravity causes the mass 1209 to move downward such that the arm 1208 such that the arm 1208 pivots about the first pivot 1214, the second pivot 1215, and the third pivot 1217, as detailed above. In this way, the arm 1208 pushes the sleeve 1280 such that the sleeve 1280 slides axially to open and to uncover the LP shaft apertures 1247. In some embodiments, a biasing member helps to pivot the arm 1208, as detailed above. One or more pumps provide a vacuum to remove hot air 1271 from the one or more cavities 225 (FIG. 2A), as detailed above. The continuous removal of the hot air 1271 from the one or more cavities 225 (FIG. 2A) cools the components uniformly around the circumference to avoid, to prevent, or to reduce bowing. In some embodiments, one or more pumps provide cooling air rather than vacuuming, as detailed above with respect to FIG. 2B.

Figure 13:
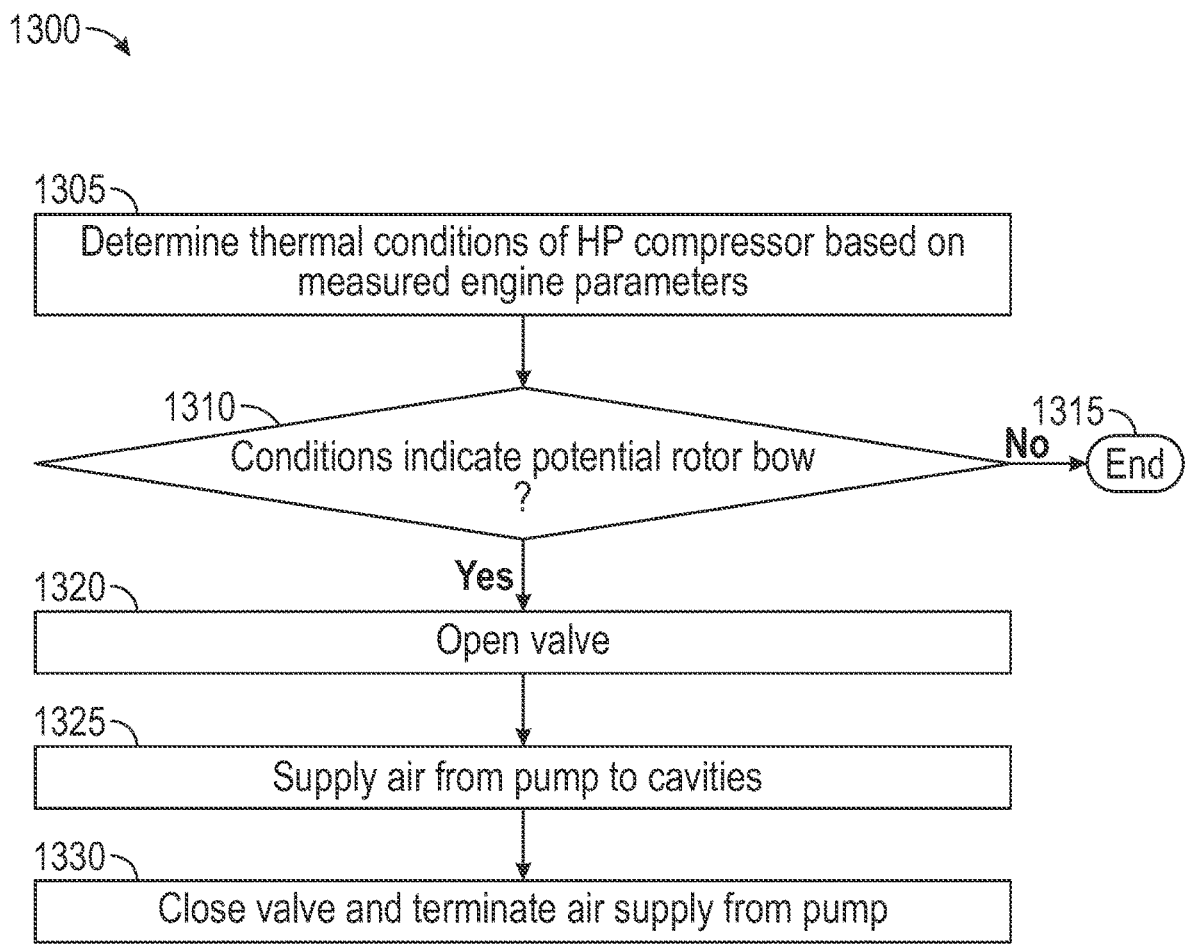
FIG. 13 is a flow diagram of an exemplary method of cooling a turbine engine, according to an embodiment of the present disclosure.

FIG. 13 is a flow diagram of an exemplary method 1300 of cooling a turbine engine, according to an embodiment of the present disclosure. While the method 1300 is described with reference to the turbine engine 210 (FIGS. 2A and 2B), the method 1300 may be performed by any of the turbine engines described herein. The controller 296 (FIGS. 2A and 2B) performs the method 1300 during the shutdown of the turbine engine 210.

In step 1305, the controller 296 determines thermal conditions of the HP compressor 24 (FIGS. 2A and 2B) based on the measured engine parameters. For example, the controller 296 can receive the measured engine parameters, as detailed above, and can determine the thermal conditions based on the measured engine parameters In step 1310, the controller 296 determines whether the thermal conditions of the HP compressor 24 indicates potential rotor bow of the LP shaft 236 (FIGS. 2A and 2B) or of the HP shaft 234 (FIGS. 2A and 2B). For example, the controller 296 can determine whether the measured engine parameters exceed one or more thresholds. The one or more thresholds associated with the thermal conditions that indicate potential rotor bow are pre-determined based on analytical predictions and engineering tests using various engine parameters. If the thermal conditions of the HP compressor 24 do not indicate potential rotor bow (step 1310: NO), the controller 296 will terminate any action to reduce or to avoid rotor bow and the method 1300 ends in step 1315.

In step 1320, if the thermal conditions of the HP compressor 24 indicate potential rotor bow (step 1310: YES), the controller 296 opens the one or more valves 294 (FIGS. 2A and 2B). For example, the controller 296 actuates the one or more valves 294 to an open position.

In step 1325, the controller 296 supplies air from the one or more pumps 292 (FIGS. 2A and 2B) to the one or more cavities 225 (FIGS. 2A and 2B). For example, the controller 296 controls the one or more pumps 292 to supply cooling air 271 (FIG. 2B) through the one or more conduits 290 (FIGS. 2A and 2B), into the LP shaft flowpath 239 (FIGS. 2A and 2B), through the LP shaft apertures 247 (FIGS. 2A and 2B) and through the HP shaft apertures 241 (FIGS. 2A and 2B), and into the one or more cavities 225, as detailed above. In some embodiments, the one or more pumps 292 generate a vacuum and draw the hot air out of the one or more cavities 225, as detailed above. In this way, the controller 296 activates the one or more pumps 292 to provide cooling air to the one or more cavities 225 or to draw hot air from the one or more cavities 225. Thus, the controller 296 activates the one or more pumps 292 to ventilate the one or more cavities 225 such that the one or more cavities 225 are cooled.

In step 1330, the controller 296 closes the one or more valves 294 and terminates the air supply from the one or more pumps 292. For example, the controller 296 controls the one or more valves 294 and the one or more pumps 292 to terminate the supply of cooling air 271 when the controller 296 determines that the thermal conditions of the HP compressor 24 no longer indicate potential rotor bow. In this way, the one or pumps 292 supply cooling air 271 to the one or more cavities 225 until the one or more cavities have been cooled and rotor bow is prevented. The controller 296 then ends the method 1300.

In some embodiments, step 1325 includes activating the one or more pumps 792 (FIGS. 7A and 7B) to ventilate the one or more cavities 225. For example, the controller 296 controls the one or more pumps 792 to draw the hot air 771 (FIGS. 7A and 7B) from the one or more cavities 225, through the HP shaft apertures 741 (FIGS. 7A and 7B) and through the LP shaft apertures 747 (FIGS. 7A and 7B), into the LP shaft flowpath 739 (and through the sleeves 780 (FIGS. 7A and 7B) and the valves 280 (FIGS. 7A and 7B)), through the conduits 290a, 290b, and removed via the one or more pumps 792, as detailed above. In such examples, in step 1330, the controller 296 closes the valves 794a, 794b (FIGS. 7A and 7B) and terminates the suction of the one or more pumps 792. For example, the controller 296 controls the valves 794a, 794b and the one or more pumps 792 to terminate the suction when the controller 296 determines that the thermal conditions of the HP compressor 24 no longer indicate potential rotor bow. In this way, the one or pumps 792 draw the hot air 771 from the one or more cavities 225 until the one or more cavities 225 have been cooled and rotor bow is prevented.

The embodiments of the present disclosure detailed herein provide for a cooling system to cool the cavities of the HP compressor uniformly after shutdown of the turbine engine to reduce or to prevent rotor bow.

Further aspects are provided by the subject matter of the following clauses.

A cooling system for a turbine engine includes a compressor, a turbine, and a shaft that drivingly couples the compressor and the turbine, the cooling system comprising one or more cavities of the compressor, and a shaft flowpath defined in the shaft, the shaft including one or more shaft apertures that provide fluid communication between the shaft flowpath and the one or more cavities, air passing through the one or more shaft apertures and the shaft flowpath to cool the one or more cavities during a shutdown of the turbine engine.

The cooling system of the preceding clause, the shaft being a low pressure (LP) shaft of the turbine engine, and the one or more shaft apertures including a plurality of LP shaft apertures positioned circumferentially about the LP shaft.

The cooling system of any preceding clause, further comprising a high pressure (HP) shaft of the turbine engine, the HP shaft including one or more HP shaft apertures, the one or more HP shaft apertures including a plurality of HP shaft apertures positioned circumferentially about the HP shaft.

The cooling system of any preceding clause, the one or more HP shaft apertures being generally axially aligned with the one or more LP shaft apertures.

The cooling system of any preceding clause, further including one or more pumps in fluid communication with the shaft flowpath, the one or more pumps causing the air to pass through the one or more shaft apertures and the shaft flowpath.

The cooling system of any preceding clause, the one or more pumps supplying cooling air to the one or more cavities through the one or more shaft apertures.

The cooling system of any preceding clause, the one or more pumps drawing hot air from the one or more cavities through the one or more shaft apertures.

The cooling system of any preceding clause, further including one or more valves associated with the one or more shaft apertures.

The cooling system of any preceding clause, the one or more valves being open during the shutdown of the turbine engine.

The cooling system of any preceding clause, the one or more valves being closed during operation of the turbine engine to seal the one or more shaft apertures.

The cooling system of any preceding clause, the air passing through the one or more shaft apertures and the shaft flowpath to reduce or prevent rotor bow of the shaft.

The cooling system of any preceding clause, the one or more valves being passive valves.

The cooling system of any preceding clause, a centrifugal force of the shaft causing the one or more valves to close during operation of the turbine engine.

The cooling system of any preceding clause, gravity causing the one or more valves to open during the shutdown of the turbine engine.

The cooling system of any preceding clause, further including a biasing member that actuates the one or more valves to open during the shutdown of the turbine engine.

The cooling system of any preceding clause, the one or more valves including sleeves disposed within the shaft flowpath.

The cooling system of any preceding clause, the one or more valves moving axially to open and to close.

The cooling system of any preceding clause, the one or more valves being disposed within a wall of the shaft.

The cooling system of any preceding clause, the one or more valves including a valve member that sits on a valve seat to seal the one or more LP shaft apertures and the HP shaft apertures during operation of the turbine engine.

The cooling system of any preceding clause, the valve member sitting on a perforated wall when the one or more valves are open during the shutdown of the turbine engine.

The cooling system of any preceding clause, the one or more valves including a biasing member coupled to the valve member.

The cooling system of any preceding clause, the biasing member being coupled to the perforated wall.

The cooling system of any preceding clause, the one or more valves including a segmented wall disposed at a radially outer end of the one or more valves, the biasing member being coupled to the segmented wall.

The cooling system of any preceding clause, the one or more valves including a cap member coupled to the valve member, and the biasing member coupled to the cap member.

The cooling system of any preceding clause, further including an actuator coupled to the one or more sleeves.

The cooling system of any preceding clause, the actuator including an arm coupled at a first end to the one or more sleeves.

The cooling system of any preceding clause, the actuator including a mass coupled to the arm at a second end.

The cooling system of any preceding clause, the arm including a first arm, a second arm, and a third arm coupled at one or more pivots.

The cooling system of any preceding clause, the arm including a first arm and a second arm coupled at one or more pivots.

The cooling system of any preceding clause, the actuator including a base member. The arm being coupled to the base member at a first pivot and coupled to the one or more sleeves at a second pivot. The arm including a third pivot between the first pivot and the third pivot.

The cooling system of any preceding clause, the third arm being coupled to the first arm and to the second arm at the third pivot, and the mass being coupled to the third arm.

The cooling system of any preceding clause, the one or more sleeves being disposed about a radially outer surface of the shaft.

A turbine engine comprises a compressor, a turbine, and a shaft that drivingly couples the compressor and the turbine, and a cooling system comprising one or more cavities of the compressor, a shaft flowpath defined in the shaft, and one or more shaft apertures in the shaft that provide fluid communication between the shaft flowpath and the one or more cavities, air passing through the one or more shaft apertures and the shaft flowpath to cool the one or more cavities during a shutdown of the turbine engine.

The turbine engine of the preceding clause, the shaft being a low pressure (LP) shaft of the turbine engine, and the one or more shaft apertures include a plurality of LP shaft apertures positioned circumferentially about the LP shaft.

The turbine engine of any preceding clause, further comprising a high pressure (HP) shaft of the turbine engine, the HP shaft including one or more HP shaft apertures, the one or more HP shaft apertures including a plurality of HP shaft apertures positioned circumferentially about the HP shaft.

The turbine engine of any preceding clause, the one or more HP shaft apertures being generally axially aligned with the one or more LP shaft apertures.

The turbine engine of any preceding clause, the cooling system further comprising one or more pumps in fluid communication with the shaft flowpath, the one or more pumps causing the air to pass through the one or more shaft apertures and the shaft flowpath.

The turbine engine of any preceding clause, the one or more pumps supplying cooling air to the one or more cavities through the one or more shaft apertures.

The turbine engine of any preceding clause, the one or more pumps drawing hot air from the one or more cavities through the one or more shaft apertures.

The turbine engine of any preceding clause, the cooling system further comprising one or more valves associated with the one or more shaft apertures.

The turbine engine of any preceding clause, the one or more valves being open during the shutdown of the turbine engine.

The turbine engine of any preceding clause, the one or more valves being closed during operation of the turbine engine to seal the one or more shaft apertures.

The turbine engine of any preceding clause, the air passing through the one or more shaft apertures and the shaft flowpath to reduce or prevent rotor bow of the shaft.

The turbine engine of any preceding clause, the one or more valves being passive valves.

The turbine engine of any preceding clause, a centrifugal force of the shaft causing the one or more valves to close during operation of the turbine engine.

The turbine engine of any preceding clause, gravity causing the one or more valves to open during the shutdown of the turbine engine.

The turbine engine of any preceding clause, the cooling system further including a biasing member that actuates the one or more valves to open during the shutdown of the turbine engine.

The turbine engine of any preceding clause, the one or more valves including sleeves disposed within the shaft flowpath.

The turbine engine of any preceding clause, the one or more valves moving axially to open and to close.

The turbine engine of any preceding clause, the one or more valves being disposed within a wall of the shaft.

The turbine engine of any preceding clause, the one or more valves including a valve member that sits on a valve seat to seal the one or more LP shaft apertures and the HP shaft apertures during operation of the turbine engine.

The turbine engine of any preceding clause, the valve member sitting on a perforated wall when the one or more valves are open during the shutdown of the turbine engine.

The turbine engine of any preceding clause, the one or more valves including a biasing member coupled to the valve member.

The turbine engine of any preceding clause, the biasing member being coupled to the perforated wall.

The turbine engine of any preceding clause, the one or more valves including a segmented wall disposed at a radially outer end of the one or more valves, the biasing member being coupled to the segmented wall.

The turbine engine of any preceding clause, the one or more valves including a cap member coupled to the valve member, and the biasing member coupled to the cap member.

The turbine engine of any preceding clause, further including an actuator coupled to the one or more sleeves.

The turbine engine of any preceding clause, the actuator including an arm coupled at a first end to the one or more sleeves.

The turbine engine of any preceding clause, the actuator including a mass coupled to the arm at a second end.

The turbine engine of any preceding clause, the arm including a first arm, a second arm, and a third arm coupled at one or more pivots.

The turbine engine of any preceding clause, the arm including a first arm and a second arm coupled at one or more pivots.

The turbine engine of any preceding clause, the actuator including a base member. The arm being coupled to the base member at a first pivot and coupled to the one or more sleeves at a second pivot. The arm including a third pivot between the first pivot and the third pivot.

The turbine engine of any preceding clause, the third arm being coupled to the first arm and to the second arm at the third pivot, and the mass being coupled to the third arm.

The turbine engine of any preceding clause, the one or more sleeves being disposed about a radially outer surface of the shaft.

A method of cooling a turbine engine during a shutdown of the turbine engine comprises determining thermal conditions of a compressor of the turbine engine based on measured engine parameters, determining whether the thermal conditions of the compressor indicate potential rotor bow of a shaft of the turbine engine, the shaft drivingly coupling the compressor and a turbine, and activating one or more pumps of the turbine engine to ventilate one or more cavities of the compressor such that the one or more cavities are cooled when the thermal conditions of the compressor indicate potential rotor bow of the shaft.

The method of any preceding clause, further including terminating operation of the one or more pumps when the thermal conditions of the compressor no longer indicate potential rotor bow of the shaft.

The method of any preceding clause, the activating the one or more pumps including supplying cooling air from the one or more pumps to the one or more cavities.

The method of any preceding clause, further including supplying the cooling air into a shaft flowpath of the shaft, through one or more shaft apertures of the shaft, and into the one or more cavities to provide the cooling air to the one or more cavities.

The method of any preceding clause, the activating the one or more pumps including drawing hot air from the one or more cavities with the one or more pumps.

The method of any preceding clause, the drawing hot air from the one or more cavities including drawing the hot air through one or more shaft apertures of the shaft, into a shaft flowpath of the shaft, and through the one or more pumps to remove the hot air from the one or more cavities.

The method of any preceding clause, one or more valves being associated with one or more shaft apertures of the shaft, the one or more valves being open during the shutdown of the turbine engine such that air passes through the one or more shaft apertures.

A method of operating a turbine engine comprises rotating a shaft during operation of the turbine engine, the shaft drivingly coupling a compressor and a turbine, causing the turbine engine to shutdown, stopping rotation of the shaft during the shutdown of the turbine engine, and ventilating one or more cavities of the turbine engine, ventilating the one or more cavities including operably directing air through one or more shaft apertures in the shaft to cool the one or more cavities.

The method of the preceding clause, the shaft being an LP shaft, and the method further including operably directing the air through one or more high pressure HP shaft apertures in an HP shaft.

The method of any preceding clause, the air being cooling air, and ventilating the one or more cavities includes supplying the cooling air to the one or more cavities.

The method of any preceding clause, the air being hot air, and ventilating the one or more cavities includes drawing the hot air from the one or more cavities.

The method of any preceding clause, ventilating the one or more cavities further including operably directing the air through a shaft flowpath of the shaft.

The method of any preceding clause, ventilating the one or more cavities further including operably directing the air through one or more conduits of the turbine engine.

The method of any preceding clause, ventilating the one or more cavities further including activating one or more pumps to provide cooling to the one or more cavities or to draw hot air from the one or more cavities.

The method of any preceding clause, one or more valves being associated with the one or more shaft apertures, and the method including opening the one or more valves during the shutdown of the turbine engine.

The method of any preceding clause, the one or more valves being passive valves.

The method of any preceding clause, opening the one or more valves by a biasing member.

The method of any preceding clause, further including causing the one or more valves to move axially to open the one or more valves.

The method of any preceding clause, further including causing the one or more valves to open by rotating the shaft.

The method of any preceding clause, further including causing the one or more valves to close by a biasing member.

The method of any preceding clause, further including causing the one or more valves to open or close by an actuator.

The method of any preceding clause, the actuator including an arm coupled at a first end to the one or more sleeves.

The method of any preceding clause, the actuator including a mass coupled to the arm at a second end, the method further including causing the one or more valves to open by the mass using centrifugal force.

The method of any preceding clause, further including cause the one or more valves to close by the mass using a biasing member.

The method of any preceding clause, the arm including a first arm, a second arm, and a third arm coupled at one or more pivots.

The method of any preceding clause, the arm including a first arm and a second arm coupled at one or more pivots.

The method of any preceding clause, the actuator including a base member. The arm being coupled to the base member at a first pivot and coupled to the one or more sleeves at a second pivot. The arm including a third pivot between the first pivot and the third pivot.

The method of any preceding clause, the third arm being coupled to the first arm and to the second arm at the third pivot, and the mass being coupled to the third arm.

The method of any preceding clause, further including causing the arm to pivot about the one or more pivots to open or to close the one or more sleeves.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A cooling system for a turbine engine including a compressor, a turbine, and a shaft that drivingly couples the compressor and the turbine, the cooling system comprising:
   one or more cavities of the compressor; and
   a shaft flowpath defined in the shaft, the shaft including:
      one or more shaft apertures that provide fluid communication between the shaft flowpath and the one or more cavities; and
      one or more valves associated with the one or more shaft apertures, wherein air passes through the one or more shaft apertures and the shaft flowpath to cool the one or more cavities during a shutdown of the turbine engine.

2. The cooling system of claim 1, wherein the shaft is a low pressure (LP) shaft of the turbine engine, and the one or more shaft apertures include a plurality of LP shaft apertures positioned circumferentially about the LP shaft.

3. The cooling system of claim 2, further comprising a high pressure (HP) shaft of the turbine engine, the HP shaft including one or more HP shaft apertures, wherein the one or more HP shaft apertures include a plurality of HP shaft apertures positioned circumferentially about the HP shaft.

4. The cooling system of claim 3, wherein the one or more HP shaft apertures are generally axially aligned with the one or more LP shaft apertures.

5. The cooling system of claim 1, further including one or more pumps in fluid communication with the shaft flowpath, the one or more pumps causing the air to pass through the one or more shaft apertures and the shaft flowpath.

6. The cooling system of claim 5, wherein the one or more pumps supply cooling air to the one or more cavities through the one or more shaft apertures.

7. The cooling system of claim 5, wherein the one or more pumps draw hot air from the one or more cavities through the one or more shaft apertures.

8. The cooling system of claim 1, wherein the one or more valves are open during the shutdown of the turbine engine.

9. The cooling system of claim 1, wherein the one or more valves are closed during operation of the turbine engine to seal the one or more shaft apertures.

10. The cooling system of claim 1, wherein the one or more valves are passive valves.

11. A turbine engine comprising:
    a compressor, a turbine, and a shaft that drivingly couples the compressor and the turbine; and
    a cooling system comprising:
       one or more cavities of the compressor;
       a shaft flowpath defined in the shaft, the shaft including:
          one or more shaft apertures in the shaft that provide fluid communication between the shaft flowpath and the one or more cavities; and
          one or more valves associated with the one or more shaft apertures, wherein air passes through the one or more shaft apertures and the shaft flowpath to cool the one or more cavities during a shutdown of the turbine engine.

12. The turbine engine of claim 11, wherein the shaft is a low pressure (LP) shaft of the turbine engine, and the one or more shaft apertures include a plurality of LP shaft apertures positioned circumferentially about the LP shaft.

13. The turbine engine of claim 12, further comprising a high pressure (HP) shaft of the turbine engine, the HP shaft including one or more HP shaft apertures, wherein the one or more HP shaft apertures include a plurality of HP shaft apertures positioned circumferentially about the HP shaft.

14. The turbine engine of claim 13, wherein the one or more HP shaft apertures are generally axially aligned with the one or more LP shaft apertures.

15. The turbine engine of claim 11, wherein the cooling system further comprises one or more pumps in fluid communication with the shaft flowpath, the one or more pumps causing the air to pass through the one or more shaft apertures and the shaft flowpath.

16. The turbine engine of claim 15, wherein the one or more pumps supply cooling air to the one or more cavities through the one or more shaft apertures.

17. The turbine engine of claim 15, wherein the one or more pumps draw hot air from the one or more cavities through the one or more shaft apertures.

18. The turbine engine of claim 11, wherein the one or more valves are open during the shutdown of the turbine engine.

19. The turbine engine of claim 11, wherein the one or more valves are closed during operation of the turbine engine to seal the one or more shaft apertures.

20. The turbine engine of claim 11, wherein the one or more valves are passive valves.

\* \* \* \* \*